US012701010B2

(12) United States Patent
Kappos

(10) Patent No.: US 12,701,010 B2
(45) Date of Patent: Aug. 4, 2026

(54) NEAR FIELD COMMUNICATION (NFC) BASED PERSONHOOD AUTHENTICATION WITH A SOCIAL NETWORK

(71) Applicant: Paul D. Kappos, Bountiful, UT (US)

(72) Inventor: Paul D. Kappos, Bountiful, UT (US)

( * ) Notice: Subject to any disclaimer, the term of this patent is extended or adjusted under 35 U.S.C. 154(b) by 170 days.

(21) Appl. No.: 17/076,768

(22) Filed: Oct. 21, 2020

(65) Prior Publication Data

US 2021/0279309 A1     Sep. 9, 2021

Related U.S. Application Data

(60) Provisional application No. 62/923,864, filed on Oct. 21, 2019.

(51) Int. Cl.
*G06F 21/31*          (2013.01)
*G06F 16/953*         (2019.01)
(Continued)

(52) U.S. Cl.
CPC ............ *G06F 21/31* (2013.01); *G06F 16/953* (2019.01); *G06K 7/1417* (2013.01); *G06Q 10/40* (2026.01);
(Continued)

(58) Field of Classification Search
CPC .................. G06F 16/953; G06F 21/31; G06F 2221/2111; G06K 7/1417; G06Q 30/018; G06Q 30/0282; G06Q 30/0609; G06Q 30/0631; G06Q 50/01; H04L 2209/805; H04L 63/0492; H04L 63/0869; H04L 9/0872; H04L 9/32; H04L 9/3231; H04W 4/023
See application file for complete search history.

(56) References Cited

U.S. PATENT DOCUMENTS

| 9,652,604 | B1* | 5/2017 | Johansson | ............. | H04W 4/021 |
| 2009/0132527 | A1* | 5/2009 | Sheshagiri | ............. | H04L 51/52 |
| | | | | | 707/999.005 |

(Continued)

OTHER PUBLICATIONS

Maier, Marco, Chadly Marouane, Claudia Linnhoff-Popien, Benno Rott and Stephan A. W. Verclas. "Vis-a-Vis Verification: Social Network Identity Management Through Real World Interactions." SOTICS 2013 : The Third International Conference on Social Eco-Informatics, Semantics Scholar (IARIA Nov. 17, 2013). (Year: 2013).*

(Continued)

*Primary Examiner* — Theodore C Parsons
(74) *Attorney, Agent, or Firm* — TechLaw Ventures, PLLC; Terrence J. Edwards

(57) ABSTRACT

Systems, methods, and devices for close proximity personhood authentication. A method includes receiving a request to authenticate a social profile of a first person. The method includes receiving first location data from a sensor associated with the first person and second location data from a sensor associated with a second person. The method includes determining the first person is in close geographic proximity to the second person based on the first location data and the second location data. The method includes receiving an indication from the second person authenticating the first person and authenticating accuracy of at least one datapoint in the social profile of the first person.

17 Claims, 11 Drawing Sheets

400

Invitation 402

First Person 302

Second Person 304

Accept Profile Exchange 404

Proximity Authentication 406

(51) Int. Cl.
    *G06K 7/14*           (2006.01)
    *G06Q 10/40*        (2026.01)
    *H04W 4/02*        (2018.01)

(52) U.S. Cl.
    CPC ..... *H04W 4/023* (2013.01); *G06F 2221/2111*
                         (2013.01)

(56)                  References Cited

U.S. PATENT DOCUMENTS

2009/0247197 A1* 10/2009 Graff ................... H04L 61/4547
                                        455/466
2009/0287596 A1* 11/2009 Torrenegra ............. G06Q 40/04
                                        705/37
2011/0047012 A1*  2/2011 Sherman ................ G06Q 30/02
                                      705/14.1
2013/0086670 A1*  4/2013 Vangpat ............. H04L 63/0815
                                      726/8
2014/0094275 A1*  4/2014 Abouchar ........... G07F 17/3272
                                      463/25
2014/0187147 A1*  7/2014 Rochberger ....... G06Q 20/3821
                                    455/41.1
2014/0228128 A1*  8/2014 Tam ..................... G06Q 40/025
                                      463/42
2014/0331282 A1* 11/2014 Tkachev ............. H04L 63/0884
                                      726/3
2016/0027079 A1*  1/2016 Schoeffler ............... H04L 63/12
                                      705/325
2017/0230348 A1*  8/2017 Bak ......................... H04L 63/08
2018/0315105 A1* 11/2018 Gandhi ................. H04L 9/3271
2020/0143027 A1*  5/2020 Toumazou ............. A61B 5/681
2020/0213298 A1*  7/2020 Ericson ................. H04W 12/47

OTHER PUBLICATIONS

International Search Report and Written Opinion from the International Searching Authority received from International Application No. PCT/US20/56728, Date of Mailing: Apr. 12, 2021, 8 pages.

* cited by examiner

100

104

Influencer
Accounts
102

Merchant
106

108

Network
110

116

Search Engine Platform
112

114

500

502

504

506

508

700

Receiving A Request From A Consumer Account For A Personalized Search Engine.
702

Providing A Personalized Search Engine That Comprises A Search Pod That Includes The Consumer Account Content, Where The User Of The Consumer Account Loads The Search Pod With Baseline Search Parameters Based On Personal Profile Likeness Or Other User Biases.
704

Providing A Qualifier And/or Quantifier Command To The User, Such That The User May Utilize The Qualifier And Quantifier Parameters Against The Retrieved Data To Discover New And Relevant Data Absent From The User's Profile, But Shared As A Commonality Amongst The Influencer Accounts.
706

Providing The Results Of The Search And Displaying Content Or Links Most Common Amongst The Influencer Accounts, But Absent From The User's Profile.
708

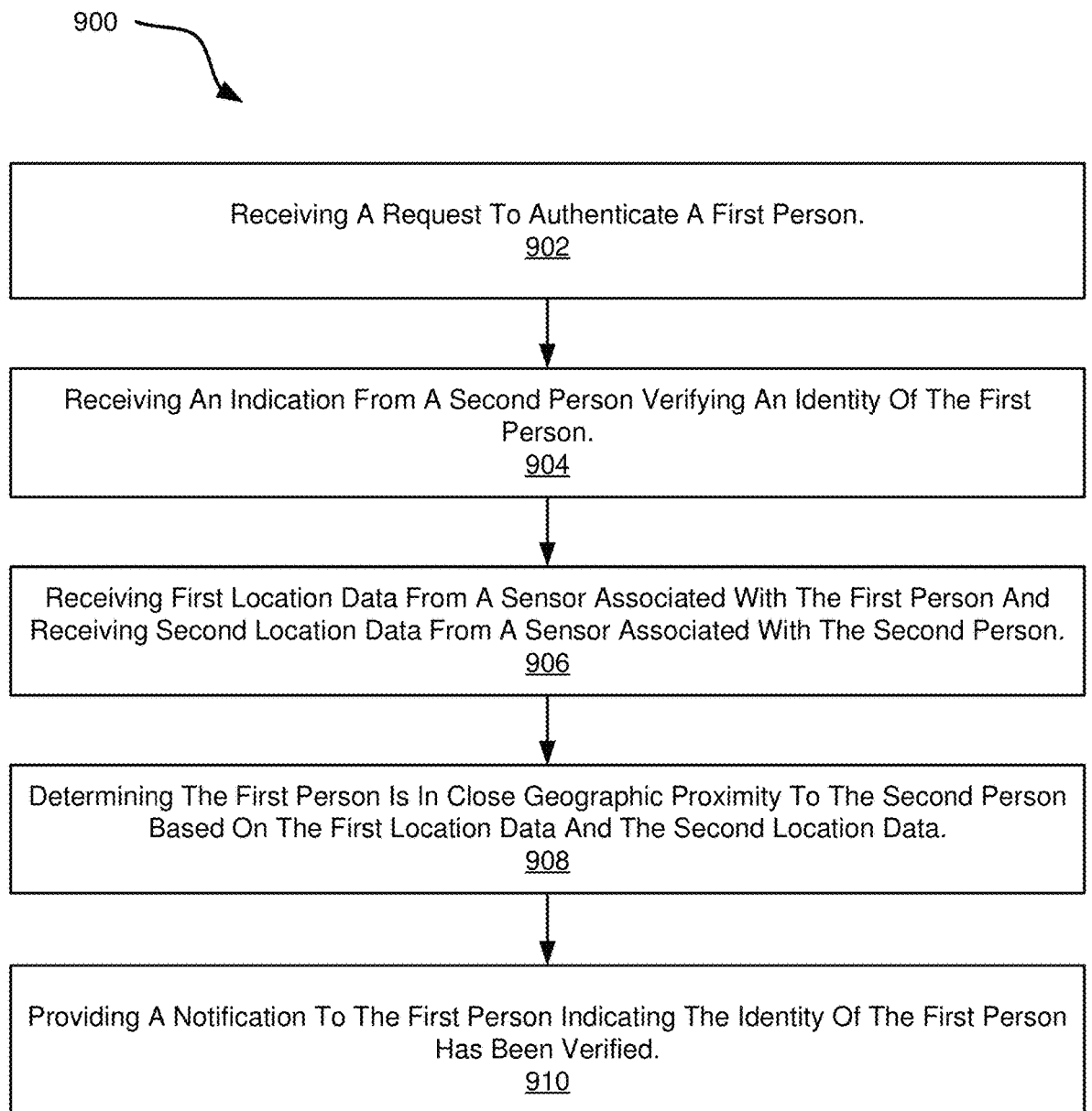

Receiving A Request To Authenticate A First Person.
902

Receiving An Indication From A Second Person Verifying An Identity Of The First Person.
904

Receiving First Location Data From A Sensor Associated With The First Person And Receiving Second Location Data From A Sensor Associated With The Second Person.
906

Determining The First Person Is In Close Geographic Proximity To The Second Person Based On The First Location Data And The Second Location Data.
908

Providing A Notification To The First Person Indicating The Identity Of The First Person Has Been Verified.
910

FIG. 9

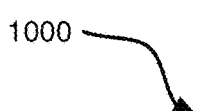

1000

Receiving A Search Request From An Account In A Social Network, The Search Request Directed To A Subject.
1002

Determining A Parameter For Filtering Accounts In The Social Network.
1004

Identifying Responsive Accounts In The Social Network Comprising Information Pertaining To The Subject.
1006

Selecting One Or More Of The Responsive Accounts That Satisfy The Parameter.
1008

Generating A Response To The Search Request Comprising The Information Pertaining To The Subject From The One Or More Of The Responsive Accounts That Satisfy The Parameter.
1010

FIG. 10

NEAR FIELD COMMUNICATION (NFC) BASED PERSONHOOD AUTHENTICATION WITH A SOCIAL NETWORK

CROSS-REFERENCE TO RELATED APPLICATIONS

This application claims the benefit of U.S. Provisional Application No. 62/923,864, filed Oct. 21, 2019, which is incorporated herein by reference herein in its entirety, including but not limited to those portions that specifically appear hereinafter, the incorporation by reference being made with the following exception: In the event that any portion of the above-referenced provisional application is inconsistent with this application, this application supercedes said above-referenced provisional application.

BACKGROUND

Significant time, resources, and efforts are expended by product and service providers to market, brand, advertise, and sell products or services to consumers in regional and global markets. Such marketing efforts can take many forms and may include seeking out and selecting brand ambassadors or promoters, generating and providing Internet, television, radio, and other advertisements, and developing a community of brand supporters. Such marketing efforts can be exceedingly costly in both time and money resources and may not provide a worthwhile return to the provider of goods or services.

Further, from the perspective of a consumer, a person may spend significant time and resources researching a subject. A consumer may seek to research a good or service the consumer is interested in purchasing, and/or the consumer may wish to research a news event or any other subject. The consumer may expend significant time researching the subject and may struggle to identify trustworthy sources. The consumer may struggle to find trustworthy information on a subject such as mathematics, science, history, and so forth. Additionally, the consumer may struggle to identify trustworthy recommendations for a product or service.

Additionally, there are numerous social networks and social platforms that are accessible over a network connection such as the Internet. Such social networks can connect family, friends, and strangers, and can enable numerous benefits. However, because these social networks are easy to join, it is easy for a person to join a social network and impersonate another individual or entity and/or create an identity that does not exist or does not reflect the person's real-life identity. This creates numerous safety issues and threatens the reliability of information, recommendations, and advice learned by way of a social network.

In light of the foregoing, disclosed herein are systems, methods, and devices for an improved secure social network that connects authenticated persons and entities. Additionally, disclosed herein are systems, methods, and devices for improved personalized search engines and marketing platforms.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where:

FIG. 7 illustrates a schematic flow chart diagram of a method for generating a personalized search engine, according to an embodiment of the disclosure;

FIG. 9 illustrates a schematic flow chart diagram of a method for securely authenticating a user account, according to an embodiment of the disclosure;

FIG. 10 illustrates a schematic flow chart diagram of a method for generating personalized search results based on recommendations by members of a social network.

DETAILED DESCRIPTION

Figure 1:
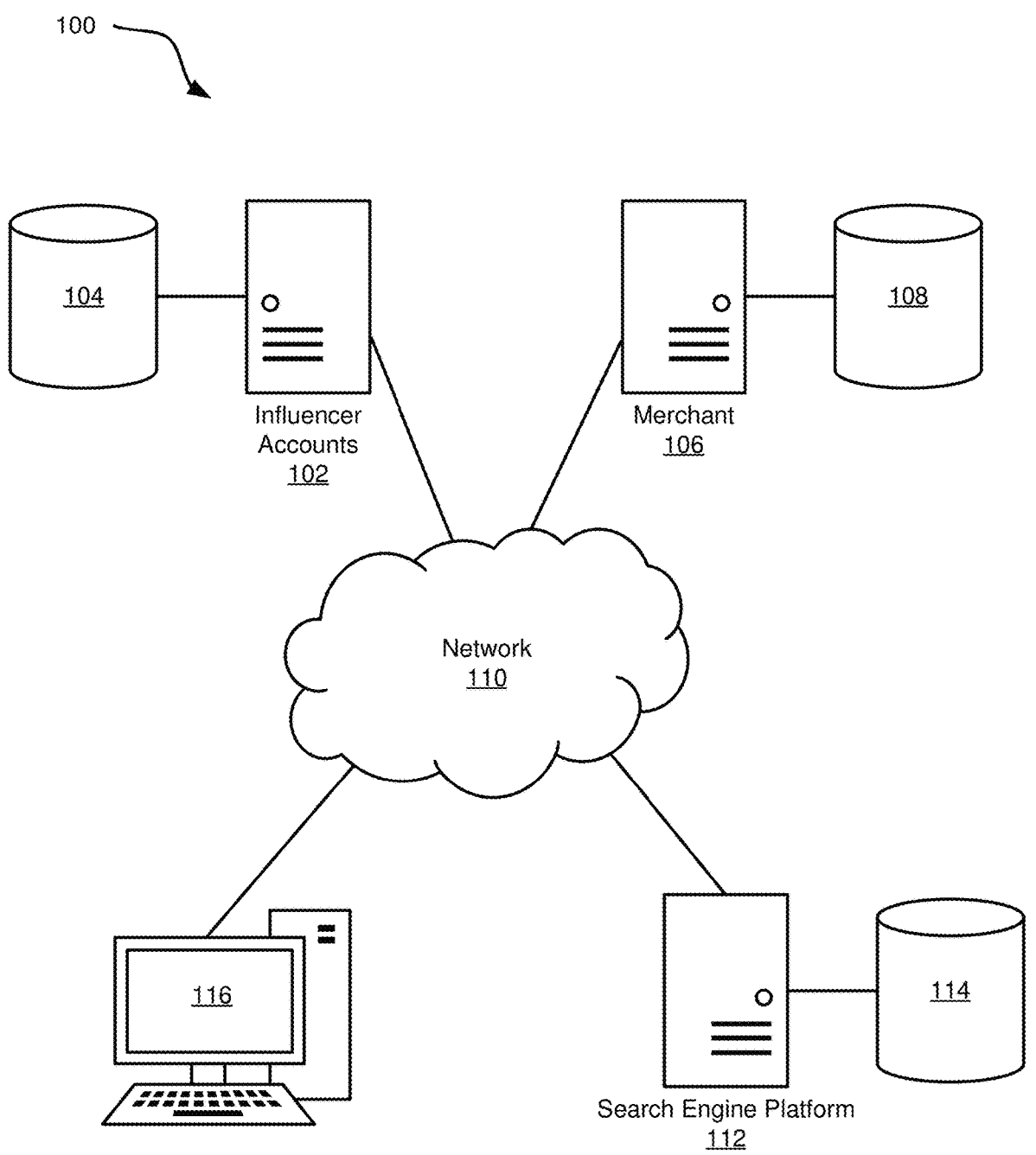
FIG. 1 illustrates a schematic diagram of a system for generating a personalized search engine.

Disclosed herein are systems, methods, and devices for a personalized and targeted search engine system. The search engine system may be implemented in a secure social network that is created using person-to-person close proximity personhood authentication. The search engine provides targeted search results and can be leveraged to improve marketing efforts for goods and services. The search engine enables a direct-to-consumer marketing platform that provides a consumer with the product recommendations of experts, influencers, and similar consumers. In an implementation where the search engine is implemented in the secure social network, the product recommendations are verified to have been created by actual persons or entities that are verified in the secure social network.

In an embodiment, a method includes receiving a search request from an account in a social network, the search request directed to a subject. The method includes identifying responsive accounts in the social network comprising information pertaining to the subject. The method includes determining a parameter for filtering the responsive accounts. The method includes selecting one or more of the responsive accounts that satisfy the parameter. The method includes generating a response to the search request comprising the information pertaining to the subject from the one or more of the responsive accounts that satisfy the parameter. Marketing campaigns are an important aspect of a product or service provider's plan to provide and sell products to consumers. Such marketing is costly in terms of time, efforts, and money, and often returns a low percentage of sales for the money spent. Such product and service providers may include manufacturers, brick-and-mortar retailers, online retailers, service providers, lenders, agents, and so forth that may operate in commerce to sell, lease, rent, advertise, or promote any good or service or political platform, idea, or news. Improvements in technology enable merchants to provide personalized marketing upon command from the consumer such that advertisements are provided only to those consumers that are more likely to be interested in the products. Such personalized marketing saves resources for those consumers who are more likely to make a purchase and is more cost-efficient than broad advertising methods. In an embodiment, there may be no cost to a merchant to display an advertisement unless a purchase of a product is transacted by a consumer.

Social media platforms provide a means for persons to share personal information and connect with other people around the globe. Such social media platforms have recognized the value in the information that is provided by consumers and may elect to sell that information to retailers, manufacturers, and other providers of goods and services. Additionally, social media platforms may provide a means for advertisers to deliver a marketing campaign directly to a targeted audience within the social media platform. However, such marketing campaigns may be costly for the advertiser and may not provide a good return on investment. Additionally, persons who elect to participate in social media platforms do not receive any financial benefit for providing personal information to the social media platform. Instead, the social media platform itself retains all the benefit by selling personal information and/or providing a means for advertising within the platform. It has been recognized that persons desire a means to personally financially benefit from providing personal information and connecting with others by providing brand or product recommendations.

It has been recognized that marketing efforts may be improved where marketing campaigns are tailored specifically to consumers who are more likely to be interested in the products. Additionally, marketing campaigns are more effective where consumers receive advice or product recommendations from a person they trust. The person they trust may include, for example, a person within the consumer's "real life" social circle and/or a person who is known to be an expert in a certain field and/or persons or entities with shared interests or points of view. Methods, systems, and devices are herein disclosed for a personalized search engine and data acquisition platform that may be particularly tailored to providing personalized and highly effective marketing campaigns. Additionally, methods, systems, and devices are disclosed herein for secure user authentication for ensuring that such search engine data is provided by real persons with real experience and knowledge in certain areas.

In an embodiment, a method for securely authenticating a user is disclosed. The method includes receiving a request to authenticate a first person. The method includes receiving an indication from a second person indicating that the second person has verified an identity of the first person. The method includes providing a notification to the first person indicating the first person has been authenticated. The method is such that authenticating the first person includes one or more of: receiving an indication from the second person that the first person is in a close geographic proximity to the second person; or receiving first location data from a first sensor associated with a computing device associated with the first person and second location data from a second sensor associated with a computing device associated with the second person such that the first location data and the second location data indicate the first person and the second person are in close geographic proximity.

Before the structure, systems, and methods for generating a personalized search engine are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Referring now to the figures, FIG. 1 illustrates a schematic diagram of a system 100 for providing a personalized search engine. In an embodiment, the system includes an influencer account 102, a merchant 106, a search engine platform 112, and a consumer account 116. Each of the influencer account 102, the merchant 106, the search engine platform 112, and the consumer account 116 may communicate over a network 110 such as a cloud computing network, a local area network, a decentralized network and so forth. In an embodiment, the influencer account 102 is an account associated with a person or entity, and the influencer account includes demographic information and interest information about the person or entity. The influencer account 102 may provide product recommendation data that may impact a commercial decision made by a consumer account 116 that conducts a search within a personalized search engine generated by the search engine platform 112. In an embodiment, the consumer account 116 is an account associated with a person or entity that wishes to utilize a personalized search engine. The person or entity may wish to conduct a search within a commercial marketplace to discover a product, good, service, organization, brand, and so forth, and the person or entity may wish to receive search results that are recommended by similar persons or entities. The merchant 106 may include a provider of goods, a provider of services, a nonprofit organization, a volunteer organization, a retailer, a manufacturer, and any other suitable organization or entity. The merchant 106 may or may not operate in commerce and may or may not provide goods or services that may be discovered via a personalized search engine. The search engine platform 112 is configured to generate a personalized search engine to be utilized by the consumer account 116. The personalized search engine may source search results from a plurality of influencer accounts 102 that form a search pool. When an influencer account 102 qualifies to be included in a search pool, the influencer account 102 may be referred to as a "search pool account."

In an embodiment, the system 100 enables a consumer account 116 to access a data lake or data bank from any location at any time. The consumer account 116 may be matched with a grouping of comparable influencer accounts 102. The consumer account 116 may search those comparable influencer accounts 102 to view the profile information and tagging information associated with the comparable influencer accounts 102. The consumer account 116 may conduct a search utilizing a search term, wherein the search is limited to profile information and product tagging information within the comparable influencer accounts 102. The results of the search may be adjusted by the consumer account in real time according to changes made to the influencer accounts 102. The consumer account 116 may filter out objectionable content and may additionally filter in desired content by adjusting parameters that change which influencer accounts 102 are searched and what search terms are searched.

The consumer account 116 may access a personalized search engine via a computing device such as a personal computer, a mobile device, a laptop, and so forth in order to perform a personalized search across large volumes of content and retrieve search results in near real time. The influencer account 102 includes a server 102 and a database 104 configured to store data relating to one or more user accounts. The influencer account 102 includes a plurality of accounts associated with persons who may have an interest or expertise in a certain hobby, consumer market, service, or product. Influencer accounts 102 may be associated in search pools that comprise a plurality of influencer accounts 102 having similarities relating to demographic information or user interest or user characteristics. The merchant 106 includes a server 106 and database 108 for storing data relating to the merchant and any goods or services provided by the merchant. It should be appreciated that the merchant 106 may include any suitable retailer, manufacturer, marketing firm, service provider, and so forth that operates in a commercial or nonprofit capacity and may have an interest in providing advertisements or notifications to persons with similar profile content and tags. The search engine platform 112 includes a server 112 and a database 114 for storing data and instructions related to providing and processing a personalized search engine to a consumer account 116.

The search engine platform 112 generates and provides a personalized search engine that may be particularly tailored for providing suggestions for goods and services that may be of interest to the consumer account 116. In an embodiment, the search engine platform 112 receives content from the influencer accounts 102 and the merchant 106 accounts via the network 110.

The influencer accounts 102 may provide demographic information, user interest information, user expertise information, user characteristics information, user hobby information, temporal status, spiritual or religious views, economic views, political views, and so forth that may indicate to the search engine platform 112 whether a particular user account is associated with an expert in a particular consumer market and/or a particular user account recommends certain goods or services. In an embodiment, an influencer account 102 comprises "tagging" or indications that the person or entity associated with the influencer account 102 has an interest in certain products, certain consumer markets, certain hobbies, and so forth. For example, the influencer account 102 may tag a specific product, hobby, interest, or inspiration to indicate that the person or entity is interested in the tagged item, recommends the tagged item, or has expertise in the tagged item. The cumulative tagging in the influencer account 102 may indicate the person or entities interests, hobbies, expertise areas, past purchases, product recommendations, and so forth. The influencer account 102 may further include reviews or recommendations for certain goods or services. The influencer account 102 may further include data about goods or services that the influencer account 102 has purchased in the past or intends or wishes to purchase in the future. Certain influencer accounts 102 may have a percentage of similarities in demographic information, characteristic information, tagging information, product review/recommendation information, and past purchase information.

In an embodiment, all user, consumer and influencer accounts are constructed in the same manner and include information that forms the basis for matching similar content and discovering new content common among a plurality of matched accounts. The influencer accounts 102 includes a plurality of accounts associated with various persons or entities. In an embodiment, each of the influencer accounts 102 is associated with an authenticated person or entity who has undergone a process of authenticating its identity. In an embodiment, the influencer accounts 102 include a mixture of persons, retailers, manufacturers, organizations, and other entities that have authenticated their identity. The data provided by the influencer accounts 102 includes, for example, user demographic information such as a person's age, gender, geographic location, income bracket, education level, temporal condition or status, and so forth. The information may further include user interest information including, for example, whether the person associated with the influencer account 102 is interested in certain entertainment providers, hobbies, products, goods, services, brands, markets, areas of interest or expertise, spiritual or religious views, economic views, political views, and so forth. Such information may indicate, for example, that a user is a computer programmer and is an expert in certain areas of computer technology and software technology. The information may further indicate, for example, that the same person is a hobby photographer with significant understanding of photography techniques and photography gear. Such information may be utilized to determine a percentage of similarity between different influencer accounts 102 and/or consumer accounts 116.

The merchant 106 provides product information for goods or services that are offered in the market. It should be appreciated the merchant 106 account may be associated with a retailer, manufacturer, nonprofit, organization, provider of goods or services, political organization, volunteer organization, and so forth. The merchant 106 account may provide details, specifications, pricing, availability, and so forth for a product, good, service, or organization that may be searched within the search engine platform 112. The merchant 106 account may further provide details for a marketing campaign including commission pay-out plans to users that will be launched by the merchant 106. The search engine platform 112 may utilize the marketing campaign to tailor search results within a personalized search engine.

In an embodiment, the search engine platform 112 compiles information from the influencer accounts 102 and determines a percentage of similarity between different influencer accounts 102. The search engine platform 112 further determines a percentage of similarity between an influencer account 102 and a consumer account 116. In an embodiment, the search engine platform 112 receives a request from a consumer account 116 by way of a search pool that personalizes the search engine by and for a consumer account 116. The search engine platform 112 is configured to utilize the request to generate a personalized search engine utilizing user-driven data and may be filtered and manipulated by user-driven commands to search a cross section of influencer accounts 102 that share certain profile identifiers or tags related to consumer account 116 and a search term for unique compatibility.

In an embodiment, the search engine platform 112 provides a personalized search engine or personalized search results that are curated based on at least two user-directed commands. One user-directed command is the similarity threshold parameter, which may alternatively be referred to as the "Qualifier" command. Another user-directed command is the precision threshold parameter, which may alternatively be referred to as the "Quantifier" command. The similarity threshold parameter sets a minimum percentage threshold of matched content between a requesting account (i.e., the account connected to the search engine platform 112 that is requesting search results) and an influencer account or regular non-influencer profile account. The search results are pulled from information associated with the matched influencer and non-influencer accounts. These matched influencer and non-influencer accounts form a search pool. The search pool is searched to render search results, content, data, and personal profile matching that may further yield other data or content relative to the initial search command as may be common amongst influencer accounts in the aggregate but absent in the requesting account. The precision threshold parameter sets a percentage threshold of an acceptable amount of content beyond the baseline of content that pertains to the initial search command. The precision threshold parameter eliminates content, profiles, or accounts from the search pool. The precision threshold parameter eliminates the contents, profiles, and accounts based on identifying which content, profiles, or account include beyond the acceptable threshold amount of content pertaining to the initial search command.

In an embodiment, a search is requested by a requesting account. The requesting account defines a "search pool" from which the search results should be sourced. The search pool includes other accounts, including consumer accounts 116 and/or influencer accounts 102 that share a threshold similarity with the requesting account based on profile characteristics and/or interest characteristics. The profile characteristics include profile information associated with the account such as gender, race, geographic location, education history, work history, income bracket, spiritual or religious views, economic views, political views, friends, professional acquaintances, professional associations, and so forth. The interest characteristics include defined interests associated with the account such as hobbies, interests, favorite movies, favorite music, favorite foods, favorite travel locations, areas of expertise, and so forth. The interest characteristics further includes content that has been saved to the account because a person associated with the account has shared, liked, tagged, saved, posted, uploaded, or otherwise interacted with certain content. The saved content may include articles, images, videos, recommendations, products, product reviews, webpages, events, and so forth. The requesting account may define the profile characteristics and/or the interest characteristics that the search pool accounts must share with the requesting account. The requesting account may further define threshold percentages of similarity for profile characteristics and/or interest characteristics that the search pool accounts mush share with the requesting account.

In an embodiment, the requesting account defines the profile characteristics for the search pool as only including accounts having the same or similar profile characteristics as the requesting account. The requesting account may define specific profile characteristics that the search pool accounts must have in common with the requesting account. For example, the requesting account may indicate that all search pool accounts must have the same gender, geographic location, and age bracket. For another example, the requesting account may indicate that all search pool accounts must have the same profession or a similar work history but may indicate that no other profile characteristics are relevant and that the search pool accounts may have a different geographic location, age bracket, income bracket, education history, gender, and so forth.

In an embodiment, the requesting account defines the interest characteristics for the search pool as only including accounts having the same or similar interests as the requesting account based on which articles, products, images, webpages, and so forth that have been saved by the requesting account and the one or more eligible search pool accounts. The requesting account may further define the search pool as only including accounts that have the same or similar purchasing patterns or purchasing history as the requesting account. The requesting account may further define the search pool as only including accounts that have the same or similar "likes" or "tags" for different articles, images, videos, products, webpages, and so forth, as the requesting account. The requesting account may narrow the search pool to include accounts with any defined similarities with the requesting account, including one or more similar profile characteristics or interest characteristics.

In an example implementation, the requesting account defines the search pool as including only accounts with similar or identical profile information for one or more characteristics such as gender, geographic location, income bracket, highest education level, age, spiritual or religious views, economic views, political views, and so forth. The requesting account may select any characteristics, and the characteristics may be different for each search requested by the requesting account. For example, the requesting account may indicate that all search pool accounts must have the same income bracket and age bracket as the requesting account for a certain search. Further in the example implementation, the requesting account may indicate that all search pool accounts must have a threshold percentage of similar interests or content tags. The requesting account may have purchased, saved, liked, tagged, posted, uploaded, and/or shared content and products. For example, the requesting account may have purchases or recommendations for certain products that a person associated with the requesting account would recommend to others. Further for example, the requesting account may have saved articles or images for inspiration that a person associated with the requesting account was drawn to or wanted to save to the requesting account. The saved articles or images could be inspiration for any suitable interest such as home design, vehicles, fashion, music, and so forth. In the example implementation, the requesting account may indicate that all search pool accounts must have saved a threshold percentage of the same articles, images, products, and so forth, as the requesting account. In a further example implementation, the requesting account may further narrow the search pool by indicating that all search pool accounts must have also saved a threshold percentage of content related to a certain interest as the requesting account. For example, the requesting account may indicate that all search pool accounts must have also saved a threshold percentage of the same women's stiletto shoes as the requesting account. It should be appreciated that the search pool may be narrowed to any suitable degree as defined by the requesting account.

The search pool is a content reference point or baseline from which the search is compared and performed. The requesting account may manipulate a similarity threshold command to indicate what search results the requesting account wishes to receive from the personalized search engine. The similarity threshold command indicates the type of accounts to be included in the search pool to create a personalized search engine for the requesting account. The similarity threshold command indicates a degree of personhood profile likeness between one or more search pool accounts as called for by one or more personhood profile data points of the requesting account, the search parameters indicated by the requesting account, profile identifiers within the requesting account that are associated with a search term, or the tags within the requesting account that are associated with a search term. The requesting account may manipulate the similarity threshold command to bring forth search results from multiple other similar accounts having profile content that matches the search pool and includes material related to the search term. The degree of profile characteristic likeness and/or interest characteristic likeness can be adjusted to a greater or lesser degree to the first influencer account's profile content within the search pool. In an example, the requesting account sets the similarity threshold parameter to a minimum of 60% profile characteristic similarity shared between the requesting account and a search pool account, and further sets the similarity threshold parameter to a minimum 40% interest characteristic similarity shared between the requesting account and a search pool account.

Additionally, the requesting account may eliminate search pool accounts based on a precision threshold parameter by indicating a maximum percentage of content differentiation that is acceptable between the content associated with the search pool accounts and the search terms. The precision threshold parameter is used to eliminate accounts that are not focused on the topic of the search or are not similar to the requesting account with respect to content relating to the topic of the search. The precision threshold parameters can be used to eliminate accounts that are attempting to recommend information for a wide variety of interests, and therefore may not provide quality curated recommendations for the search topic. The precision threshold parameter is used to ensure that the search results include a curated collection of recommendations from accounts that are very similar to the requesting account with respect to the search topic and/or are highly specialized in the search topic.

For example, the requesting account may request a search having the search terms, "best water conservative plants." The requesting account may define the search pool as including accounts in the same geographic location and may further define the search pool as including accounts with 50% content similarity overall. The search for "best water conservative plants" may then be performed by searching only the content associated with the accounts in the search pool. Therefore, the search results for "best water conservative plants" will include articles, videos, images, products, webpages, and other information for water conservative plants that has been saved by the accounts within the search pool. The requesting account may further narrow the search results by eliminating search pool accounts based on the precision threshold parameter. The requesting account may use the precision threshold parameter to eliminate accounts that do not share a threshold similarity with the requesting account with respect to "water conservative plants." The precision threshold parameter will be implemented by scanning the content saved by the search pool accounts pertaining to "water conservative plants" and comparing that with the content already saved by the requesting account that pertains to "water conservative plants." The search pool accounts that do not meet a threshold percentage of similarity with the requesting account with respect to content pertaining to "water conservative plants" will be eliminated from the search pool. This further narrows the search results to include only content pertaining to water conservative plants that is likely to be relevant to the requesting account based on the content already saved by the requesting account. Alternatively, or in addition to the above implementation, the precision threshold parameter may be implemented by scanning all content saved by search pool accounts and eliminating accounts that have saved a wide variety of content that does not pertain to "water conservative plants." Therefore, the search results will include results from accounts that are more highly specialized in gardening and/or water conservative plants. The requesting account defines the precision threshold parameter by defining a threshold percentage of similarity between the search pool accounts and the requesting account for content pertaining to the search topic and/or a threshold percentage of content saved by the search pool accounts that pertains to the search topic.

The precision threshold parameter determines the percentage of volume and richness of the search and discovery results viewed by the requesting account by eliminating certain search pool accounts. The precision threshold parameter may improve the search results in the personalized search engine by ensuring that a search pool account with an overly broad spectrum of content with little focus or expertise on the search topic is not utilized for providing information on the search topic.

In an example illustrating the similarity threshold parameter, a requesting account wishes to conduct a search to find and purchase a new pair of shoes. The requesting account wishes to utilize a personalized search engine to conduct a search for shoes that fit within the person's personal style aesthetic. The requesting account adjusts the similarity threshold parameter to have a threshold level of similarity to the requesting account. In such an example, only search pool accounts with at least the threshold percentage of similarity in profile characteristics and/or interest characteristics with the requesting account will be utilized in the search pool for the personalized search engine. As such, only shoe recommendations from search pool accounts with a similar style aesthetic will be utilized to provide shoe suggestions to the requesting account. It will be appreciated that the precision threshold parameter may also be used in conjunction with the similarity threshold parameter.

As part of this example, the precision threshold parameter may be used when the requesting account wishes to increase the number of relevant or highly relevant search results provided by the personalized search engine. Higher quality search results may be obtained from search pool accounts that are specialized or more focused in the specific search term (i.e. a certain type or style of "shoes"). In this example, a first search pool account may include a consumer information entity specializing in reviewing and testing products relating to wedge shoes for women. The first search pool account may have 90% of its profile content and tagging directed to wedge shoes for women and the first search pool account may be regarded as an expert in the area of women's wedge shoes. In the example, a second search pool account may include a person with a wide variety of interests, and one of those interests may include shoes and possibly even women's wedge shoes. The second search pool account may have 5% of its profile content and tagging directed to women's shoes and may be regarded as a casual consumer of women's shoes with little expertise in wedge shoes. The second search pool account having 5% of its content directed to women's shoes may still be referenced due to profile compatibility. In this example, a requesting account may benefit by altering the precision threshold parameter such that the search pool includes only those search pool accounts that have at least, for example, 40% of the content saved to the account directed to women's shoes or even women's wedge shoes. This may ensure that search results provided by the personalized search engine are higher quality search results obtained from search pool accounts that are specialized in the search term. In this way, a consumer may fine tune the search results using the similarity threshold parameter and the precision threshold parameter to meet specific interests or search parameters.

In another example illustrating the similarity threshold parameter used in conjunction with the precision threshold parameter, a requesting account wishes to conduct research, discover and purchase music. The requesting account wishes to utilize a personalized search engine to conduct a search using a variety of songs loaded into a music pod. In the example, the requesting account may require from the personalized search engine results from influencers that meet a minimum similarity threshold percentage of 50% of like songs found in the requesting account's own music profile or a sub-file of gathered songs within its customized music pod. The first search pool account may have only 10% of its total personal profile content and tagging similar to the requesting account but share a threshold 70% level of similarity in music files or certain music-pods/sub-files within the music file or music profile. The search pool account may then be regarded as a trusted source in the area of that certain grouping of music. In the example, a second search pool account may include a person with a wide variety of musical interests, and those interests may include 95% of all the requesting account's music requirements outlined in the personal search engine. A requesting account may benefit by altering the similarity threshold and precision threshold parameters such that the search pool includes only those search pool accounts that have at least the threshold level of similarity with a user's profile characteristics and/or saved music content. This may ensure that search results provided by the personalized search engine are of higher quality search results obtained from search pool accounts that are focused in the search term (i.e. "a grouping of favored music") without an excess of undesired content.

In an embodiment, the search engine platform 112 compiles information from the search pool accounts and determines an expertise level for a certain market for each search pool account. In an embodiment, the search engine platform 112 may rank groupings of search pool accounts into "expert search pools" where an expert search pool includes persons with similar degrees of expertise, taste, opinions and experience levels in a certain market or area of interest. The expert search pool may depend on a variety of factors, including, for example, demographic details such as may indicate the person is a novice, amateur, semi-professional, professional, or expert in a certain market. In an embodiment, the search engine platform 112 generates a personalized search pool to be utilized by a requesting account, and the personalized search pool may comprise information from search pool accounts that are associated with persons similar to the person associated with the requesting account. In an embodiment, the requesting account indicates what type of search pool accounts should be included in the search pool. The search engine platform 112 compiles commercial information for the search pool accounts in the search pool. Such commercial information includes, for example, past purchases of goods or services, recommendations or reviews for goods or services, wish lists or shopping lists, and so forth that are indicated by the person associated with the search pool account. The personalized search engine provided by the search engine platform 112 may enable a requesting account to search for, for example, "music," and the search engine platform 112 will provide public and commercial information extracted from the search pool accounts in the search pool.

Figure 2:
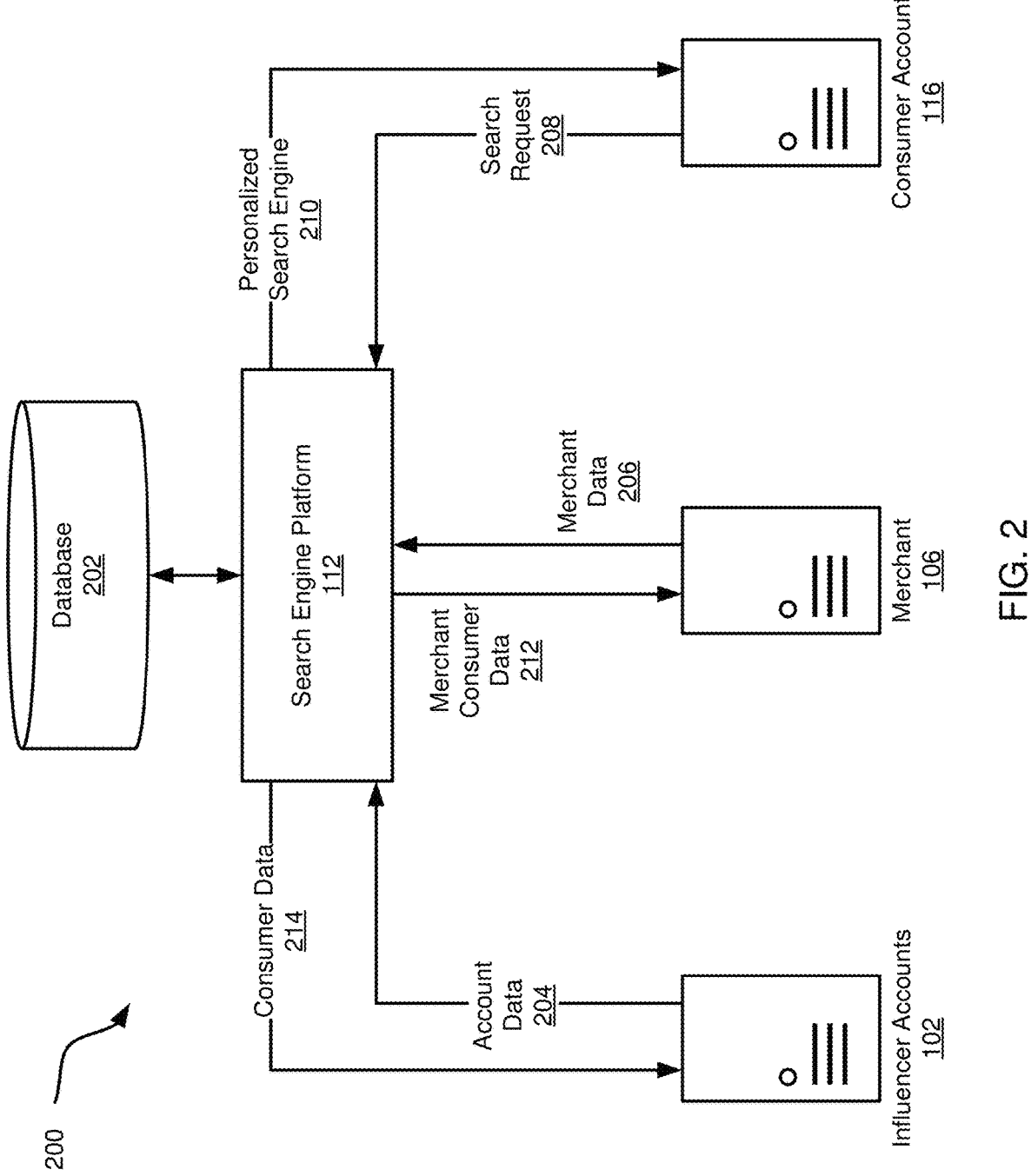
FIG. 2 illustrates a schematic diagram illustrating communication channels between a search engine platform and influencer accounts, merchant accounts, consumer accounts, and a database.

FIG. 2 illustrates a schematic diagram of a system 200 for providing a personalized search engine. The system 200 includes a database 202 for storing data such as user account information received from an search pool account, merchant information received from a merchant 106 account, personalized search engine parameters received from a consumer account 116, and so forth. The system 200 includes a search engine platform 112 for providing a personalized search engine to a consumer account 116. In an embodiment, the search engine platform 112 receives a search request 208 from a consumer account 116. The consumer account 116 may be an account associated with a person or entity that wishes to perform a personalized search that provides search results from persons or entities similar to the consumer account 116. The search engine platform 112 generates a personalized search engine 210 utilizing account data 204 received from a plurality of search pool accounts 102 and merchant data 206 received from a merchant 106 account. The personalized search engine 210 may be generated to provide search results associated with a search pool, wherein the search pool comprises a plurality of search pool accounts 102 that are similar to the consumer account 116 or are within the search parameters received from the consumer account 116. The consumer account 116 may interact with the personalized search engine 210 by performing searches for products, goods, services, and/or entities within the personalized search engine 210. The consumer account's 116 interaction with the personalized search engine 210 including, for example, tags and, purchases, but not clicks and views outside the users direct control, of items within the personalized search engine 210 that may be reported back to a user account as consumer data 214 or to a merchant 106 account as merchant consumer data 212. In an embodiment, the consumer data 214 includes an indication that the consumer account 116 read or viewed a review provided by an search pool account, purchased a good or service recommended by an search pool account, and so forth. The merchant consumer data 212 may include an indication or user generated Tag that the consumer account 116 viewed, researched, or purchased a product or good provided by the merchant 106 or a merchant 106 competitor, and so forth.

Figure 3:
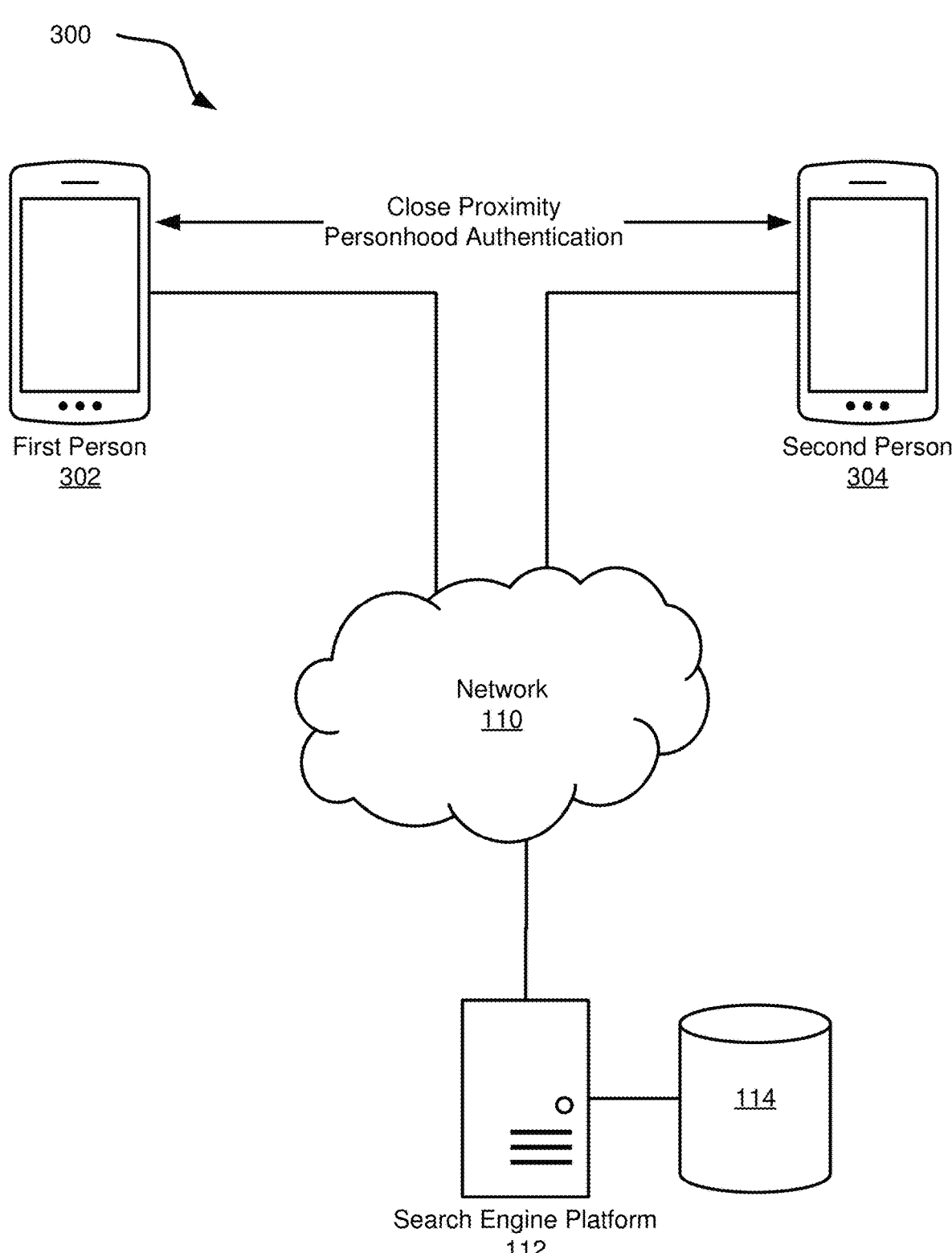
FIG. 3 illustrates a schematic diagram of a system for securely authenticating a user account.

FIG. 3 is a schematic diagram of a system 300 for authenticating a person or entity associated with a user account. The person or entity may be authenticating by verifying that the person or entity is genuine and by verifying the identity of the person or entity. The system 300 may utilize the exchange of Near Field Communication (NFC) tokens, QR codes and other distance limited technology such as a microphone and camera for authenticating the person or entity is in close physical relation to another person(s) or entity for the purpose of in-person authentication of another person for use within the broader context of the "person authentication network" and their personal account. In an embodiment, one account may generate and share a QR code with another account, and the second account may scan the QR code on the device of the first account to confirm the shared QR code and indicate that persons associated with the accounts are in close geographic proximity to one another. The system 300 may utilize geographic location (geo-tagging) to determine and validate where and when that two or more authenticating parties are or were in close proximity to each other for the purpose of person authentication. Additionally, the system 300 may utilize facial and iris recognition, finger print recognition, voice recognition, vibration or heart beat recognition, and DNA information to confirm that one or both of the parties performing the authenticating via a specific device is the actual owner of the device and the owner of certain other documents, assets, relations and other types of important and valuable things related to the individual person that may be included in the person authenticated profile.

In an embodiment, the system 300 for authenticating a person or an account, is configured for ensuring that a person or user accounts are associated with real persons or entities and are not generated by fictitious persons, bots or other automated systems. The system 300 includes a search engine platform 112 in communication with a first person 302 and a second person 304 via a network 110 such as a cloud or central computing network or another suitable network such as a distributed network. In alternative embodiments, each of the persons (or entities) 302, 304 may be authenticated. In further embodiments, each of the persons (or entities) 302, 304 may have been authenticated one or more times, and the search engine platform 112 may require that a person or an account is authenticated a threshold number of times before the person or account is fully and officially authenticated.

In an embodiment, the first person 302 may or may not have been previously authenticated and associated with a user account. In an embodiment, the second person 304 seeks to create a new user account and has not previously been authenticated or verified. In an embodiment as illustrated in FIG. 3, the authentication process includes the use of computing devices such as mobile phones that are associated with the first person 302 and the second person 304. In an embodiment, the computing devices include a sensor such as Near Field Communication (NFC), QR codes or other limited distance electronic signal, a camera, a microphone or global positioning system and time stamping clock that may be utilized to enable the additional layers of person authentication. In an embodiment, the first person 302 is in close geographical proximity to the second person 304, and the first person 302 verifies the personhood and identity of the second person 304 and vice versa if elected. The search engine platform 112 may receive verification of a personas performed via NFC or other distant limited electronic, optical or acoustic signals or readings that the first person 302 and the second person 304 are real and in close geographical proximity. Additionally, by receiving other data such as time-stamped global positioning, optical and acoustical readings via hardware systems within the computing devices. The search engine platform 112 may receive other authentication of a person and further corroborate the personhood identity of a person or entity of either the first person 302 or the second person 304. Such biometric sensors may include, for example, a retinal scan, a fingerprint scan, voice recognition, vibration or heartbeat recognition, DNA reading, a camera in communication with or any sensor supported by a machine learning system, and so forth.

In an embodiment, a camera within the mobile device associated with the second person 304 may capture a photograph of the second person 304 and the search engine platform 112 may utilize that photograph to verify the identity of the second person 304. In a further embodiment, the image captured by the camera may be processed through a neural network to confirm with facial recognition whether the person is the actual owner of the mobile device. The system may verify the identity of the second person 304 by comparing the image captured by the camera against, for example, profile images of the second person provided to the system by the second person or from a publicly known and accepted database, such a driver's license, passports, or other government issued identification.

In an embodiment, a first person 302 may be permitted to engage with the search engine platform 112 as an influencer account 102 and/or consumer account 116. In certain embodiments it may be beneficial to ensure that all influencer accounts 102, merchant 106 accounts, and consumer accounts 116 are associated with genuine persons or entities and are not generated by fictitious persons, bots or any other automated process. Particularly where a marketing campaign is in place to provide credits or payouts to certain accounts, it may be important to ensure that such accounts are genuine and associated with a real person or entity. The system 300 for authenticating a user account may be used in conjunction with the system 100 for providing a personalized search engine and/or the process flow 800 for providing a personalized marketing campaign.

In an embodiment, a first person 302 or entity is authenticated by a second person 304, whether or not the second person 304 has been authenticated or is associated with the search engine platform 112 in any manner. In an embodiment, the second person 304 has not been authenticated and is not associated with the search engine platform 112 and is not associated with an influencer account 102, merchant 106 account, or consumer account 116. Still, the second person 304 may verify the identity of the first person 302 or entity and provide an authentication of the first person 302 or entity to the search engine platform 112.

In an embodiment, a person may engage with the search engine platform 112 only after the person's profile on the search engine platform 112 has been authenticated as truthful and legitimate by another previously authenticated person. An authenticated person may log into or otherwise interface with the search engine platform 112 for the purpose of improving the quality of engagement with the search engine platform 112 and with other authenticated users. In an embodiment, the authenticated persons may log into or interface with other platforms that use the same network of authenticated persons. The platform of authenticated persons may be used for blockchain or crypto-currency transactions by importing personhood identification into these blockchain or crypto-currency systems.

Figure 4:
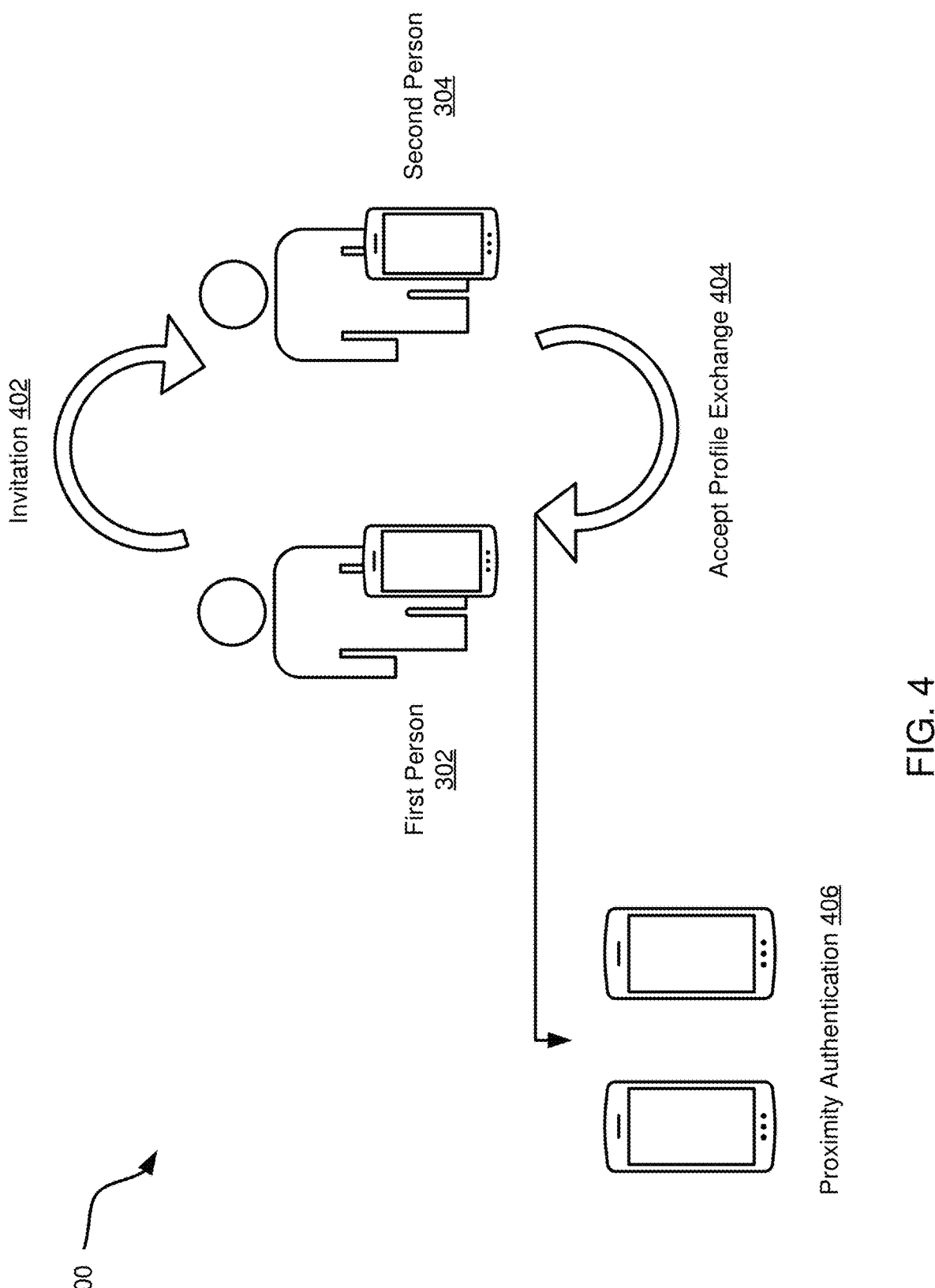
FIG. 4 illustrates a schematic diagram of a system for securely authenticating a user account.

FIG. 4 is a schematic diagram of a process flow 400 for person-to-person close proximity personhood authentication. In the process flow 400, the first person 302 sends an invitation 402 request to the second person 304. The second person 304 accepts the profile exchange 404. The first person 302 and the second person 304 can then meet in-person and "bump" via NFC tokens or QR codes to perform proximity authentication 406.

The process flow 400 may be implemented to ensure that all members in a social network are in fact who they say they are. A secure and verified social network may include only persons and entities who have been authenticated by way of the process flow 400 or some other secure authentication mechanism. The process flow 400 ensures that each member of the network is a real person, has provided accurate images to the social network, has provided an accurate name to the social network, has provided an accurate geographical location to the social network, has provided accurate background information to the social network, and so forth. For example, a new person wishing to gain access to the social network may provide a name, one or more profile images, a date of birth, an education history, a work history, and so forth to the social network. A different person who is already a member of the social network and personally knows the new person may authenticate the new person's information and grant the new person access to the social network. This ensures that all members of the social network have been verified in real life and have provided accurate information to the social network.

The first person 302 sends the invitation 402 by way of the network 110. The invitation 402 can be facilitated by the search engine platform 112 or some other platform. The first person 302 may be restricted to sending an invitation 402 only to people the first person 302 has interacted with and knows in "real life" outside of the social platform. The invitation 402 is a means for the second person 304 to join the social network. In an embodiment, no person or entity is permitted to join the social network without an invitation 402 from a person that is already a member of the social network. In an embodiment, the first person 302 sends the invitation from a personal computing device such as a smart phone, computer, and so forth. The second person 304 may then receive the invitation by way a phone call, email, text message, push notification, and so forth. The second person 304 may accept the profile exchange 404 by indicating that the second person 304 will join the social network and be authenticated by the first person 302.

The proximity authentication 406 may be performed by near field communication (NFC) when the first person 302 and the second person 304 are in close geographical proximity to one another. In an embodiment, the first person 302 and the second person 304 must meet up in person and each bring a computing device such as a smart phone that is known to be associated with that person. The exchange of NFC tokens or QR codes, the "bump," may be leveraged to identify whether the smart phone for the first person 302 and the smart phone for the second person 304 are in fact in close geographical proximity to one another. The first person 302, who is already a member of the social network, may then "bump" with the second person 304 by indicating on a computing device connected to a network that the second person 304 is in fact a real person or entity and should be granted permission to join the social network.

In an embodiment, the first person 302 must review known information about the second person 304 before verifying the identity of the second person 304. For example, the first person 302 may be required to accept identifiers provided by the search engine platform 112 that have been provided by the second person 304. For example, the first person 302 may need to verify the name, birthdate, address, and so forth of the second person 304 when the first person 302 and the second person 304 are in close geographical proximity to one another. Additionally, the first person 302 may need to verify one or more images of the second person 304 that are provided by the second person 304 and will permanently remain a part of the second person's 304 profile.

In an embodiment, time tracking is performed to determine the amount of time the first person 302 and the second person 304 are in close geographic proximity to one another. Time tracking may be used to store how much time a person spends with certain individuals. In an embodiment, there is provided a log or display of an account holder's IRL (in real life) social activity with other individuals and groups in a social network.

In an embodiment, media generating hardware such as cameras, videos, and audio are restricted within an application for performing proximity authentication. The media generating hardware may be activated within the application when a first person 302 and a second person 304 sharing an existing mutual authentication of each other are in close geographic proximity to one another as confirmed using Bluetooth, WiFi, Geo-tagging, NFC, cellular signal or other proximity sensitive technology or signal. The restriction may be impactful within a social platform so that no media generated outside the app can be imported into and displayed within the social platform, thus fulfilling a desire to share only IRL (in real life) social experiences on the platform.

In an embodiment, two or more persons are in close geographic proximity to one another when at least one of the two or more persons can sense the one or more other persons with human biological senses such as sight, touch, hearing, and smell. For example, a first person and a second person are in close geographic proximity if the persons can see and hear each other. The close proximity personhood authentication disclosed herein may rely on a person's biological senses in combination with computer systems and networks. In an embodiment, the first person 302 is permitted to authenticate the second person 304 only if the first person 302 and the second person 304 are deemed to be in close enough proximity to see and/or hear each other. The first person 302 then uses human biological senses such as sight, hearing, touch, and smell to identify that the second person 304 matches at least one social profile identifier on the second person's 304 social profile. The first person 302 may then indicate on a computing device that the second person 304 is a genuine person and has provided factual information in the social profile.

In an embodiment, the close geographic proximity is defined by a quantifiable distance. In an embodiment, close geographic proximity is defined as the first person 302 and the second person 304 being within three feet of one another. In an embodiment, close geographic proximity is defined as the first person 302 and the second person 304 being within five feet of one another. In an embodiment, close geographic proximity is defined as the first person 302 and the second person 304 being within ten feet of one another. In an embodiment, close geographic proximity is defined as the first person 302 and the second person 304 being within fifteen feet of one another. In an embodiment, close geographic proximity is defined as the first person 302 and the second person 304 being within twenty feet of one another. In an embodiment, close geographic proximity is defined as the first person 302 and the second person 304 being within twenty-five feet of one another. In an embodiment, close geographic proximity is defined as the first person 302 and the second person 304 being within thirty feet of one another. In an embodiment, close geographic proximity is defined as the first person 302 and the second person 304 being within thirty-five feet of one another. In an embodiment, close geographic proximity is defined as the first person 302 and the second person 304 being within forty feet of one another. The distance between the first person 302 and the second person 304 can be verified based on a location sensor associated with the first person 302 and a location sensor associated with the second person 304. In an example, the first person 302 has a mobile telephone device including a Global Positioning System (GPS), and the second person 304 has a mobile telephone device including a GPS. The GPS data from the first person's 302 device and the GPS data from the second person's 304 device can be assessed to determine if the first person 302 and the second person 304 are in close geographic proximity to one another.

In an embodiment, prior to an authentication event between the first person 302 and the second person 304, one or both of the parties 302, 304 may agree to be notified when the parties are in close geographic proximity to one another. For example, the first person 302 and/or the second person 304 may have previously been authenticated within an authenticated social network (see 500) by one or more outside persons. Alternatively, only one of the parties 302, 304 may have previously been authenticated in the social network 500. The first person 302 might send an invitation 402 to the second person 304 indicating that the first person 302 would like the second person 304 to authenticate the first person 302. The first person 302 may provide permissions for the platform to notify the second person 304 when the first person 302 and the second person 304 are in close geographic proximity to one another. Further, the second person 304 may receive the invitation 402 and provide permission for the platform to notify the first person 302 when the first person 302 and the second person 304 are in close geographic proximity to one another. The platform may determine based on, for example, cellular signal, GPS signal, WiFi signal, some other nearfield communication signal, or some other location-based identifier that the first person 302 and the second person 304 are in close geographic proximity to one another. The system may provide a notification to of the first person 302 and/or the second person 304 indicating that the parties 302, 304 are in close geographic proximity to one another and therefore have an opportunity to authenticate one another, or for one of the parties 302, 304 to authenticate the other party. In such an embodiment, the parties 302, 304 may have previously provided location permissions to the platform such that the platform knows the locations of the parties 302, 304. The parties 302, 304 may further provide permissions to the platform to alert the corresponding party when the parties 302, 304 are in close geographic proximity to one another.

Figure 5:
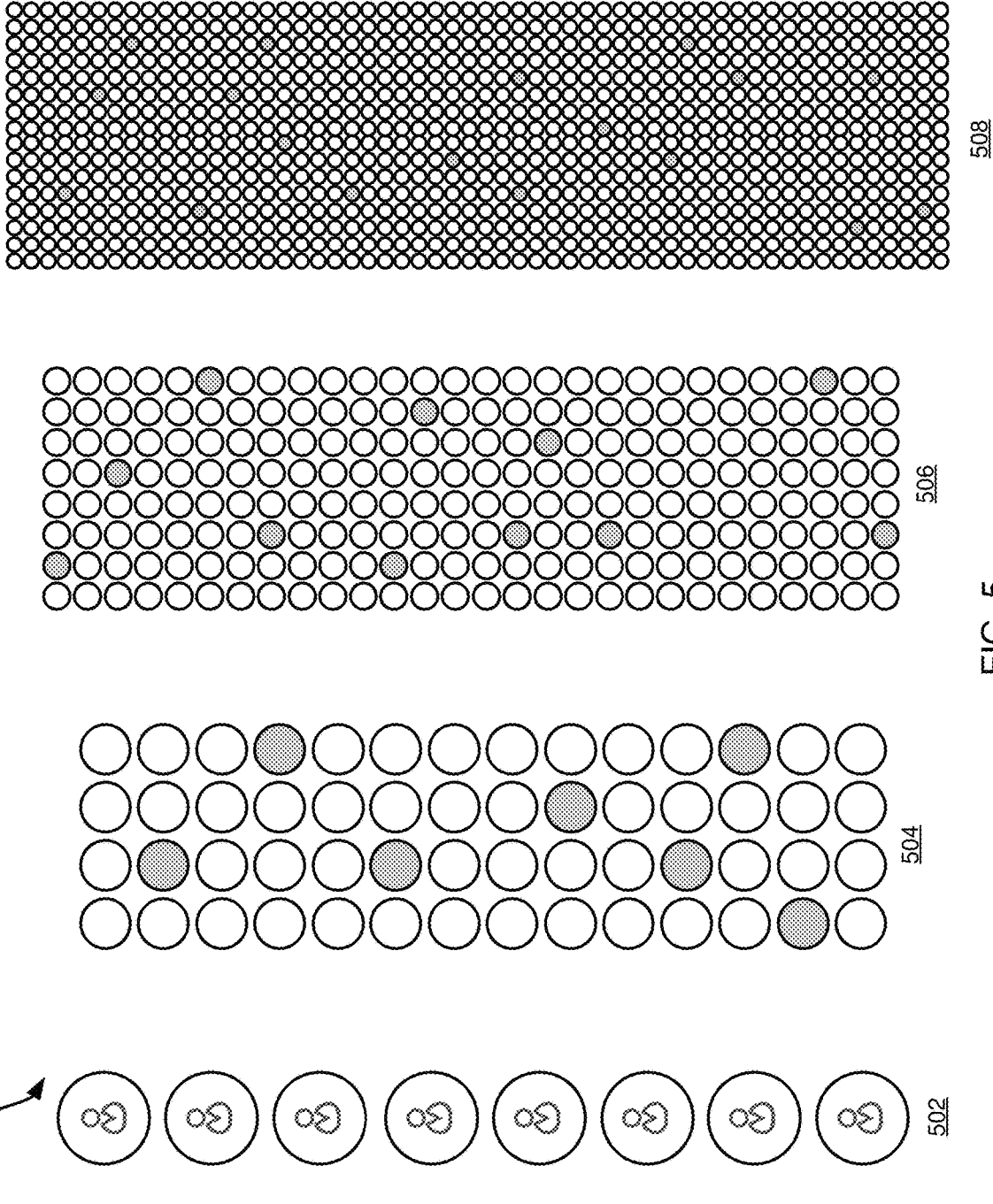
FIG. 5 is a schematic diagram of a social network illustrating an authentication flow wherein a first group is authenticated by one individual and subsequent groups are authenticated by other members in the social network.

FIG. 5 is a schematic diagram of a secure and authenticated social network 500. The social network 500 is made up only of people who have been authenticated by way of the process flow 400 illustrated in FIG. 4 or by some other secure authentication method. This way, each person or entity in the social network 500 has been authenticated to ensure that each member is in fact a real person or entity and has provided accurate profile information to the social network 500.

The first level grouping 502 may indicate members in the social network 500 that are personally acquainted with a user. The first level grouping 502 may include members who were authenticated by the user. The first level grouping 502 may include members who have granted contact information to the user.

The second level grouping 504 may include members in the social network 500 that are personally acquainted with the user and may further include other members in the social network 500 that the user is "following" but does not personally know. This may also be the case for the third level grouping 506 and the fourth level grouping 508. The second, third, and fourth level groupings further illustrate how the social network 500 grows when members authenticate additional members. For example, each member in the first level grouping 502 may have been authenticated by a single user. The second level grouping 504 may include additional members who were authenticated by the members in the first level grouping 502. The third level grouping 506 may include additional members who were authenticated by the members in the second level grouping 504, and so forth.

The second level grouping 504, the third level grouping 506, and the fourth level grouping 506 include profiles that are greyed out in the illustration shown in FIG. 5. The greyed profiles may indicate persons or entities that meet search criteria indicated by the user when the user is interacting with the search engine platform 112. In an example, the user sends a request to the search engine platform 112 to provide product or service recommendations of a certain type. The user may request recommendations by experts in the field, other user with similar tastes to the user, influencers in the field, and so forth. The second, third and fourth level groupings may indicate different results identified by the search engine platform 112.

In an embodiment, the search engine platform 112 provides search results based on product and service recommendations received by members in the social network. The personalized search results may be based on the products and services purchased by or recommended by members of the social network according to parameters set by a searching user.

In an embodiment, media that is generated at an IRL event may be organized and displayed according to the date and time and location of the social event. Media display may be provided in various configurations such as, for example, by an individual person's timeline or calendar, or by a cumulative of select individuals or event types shown on a single calendar, timeline or other display types under a user's directive.

Figure 6:
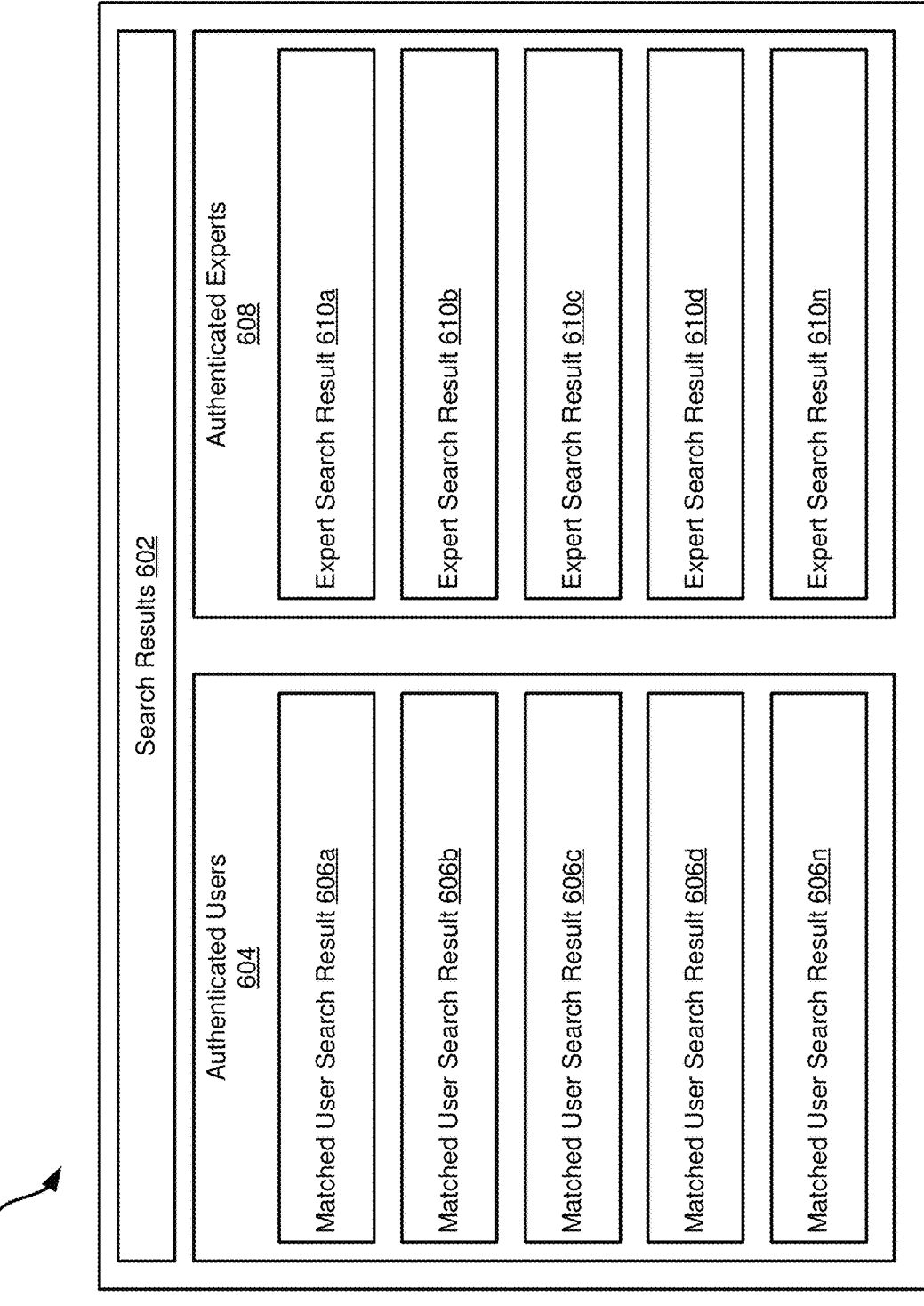
FIG. 6 is an example screenshot of search results generated by a personalized search engine platform.

FIG. 6 is an example screenshot 600 of a user interface of a personalized search engine system. The screenshot 600 provides search results 602 to a user that submitted a request for personalized search results. In an embodiment, the user requests product recommendations, service recommendations, news articles, opinion articles, information articles, photos, video, audio and so forth from the search engine platform 112. The user may further submit parameters for how the search engine results should be prioritized. For example, the user may indicate that the results should include a mixture of recommendations from experts along with recommendations from members the user personally knows and/or recommendations from members who have similar interests to the user.

The search results 602 in the example screenshot 600 include recommendations from authenticated users 604 and recommendations from authenticated experts 608. The authenticated users 604 and the authenticated experts 608 have been authenticated by way of an authentication process flow 400 such as those discussed herein. The search results

602 include matched user search results 606a-606n from authenticated users 604 matching the user's parameters. The authenticated users 604 may match the user's parameters because they have a similar background, similar interests, similar buying patterns, similar searching patterns, are known to the user, and so forth. The search results 602 include expert search results 610a-610n from authenticated experts 608 matching the user's parameters. The authenticated experts 608 may be identified because they are experts in the field the user is researching, are influencers in the field the user is researching, have a similar background to the user, have similar interests to the user, and so forth.

In an embodiment, the search engine platform 112 generates a result for a search request directed to a subject. The search engine platform 112 generates the result based on information associated with accounts in a secure social network such as the social network 500 shown in FIG. 5. In an embodiment, there are search results associated with the accounts in the social network. A search result is associated with an account in the social network if the account has uploaded, saved, liked, tagged with a hyperlink, interacted with, and/or recommended the search result. The search result may include a website, article, piece of information, product, good, service, and so forth. The search engine platform 112 provides search results by filtering the accounts in the social network based on parameters. A parameter may be set by default and/or may be manipulated by the account requesting the search result. The parameter may request search results that are associated with accounts having similar characteristics to the account that requested the search result. The parameter may request search results that are associated with accounts that have been established as an "expert" in the field of the subject of the search request.

For example, an account submits a search request for "best digital camera." The account sets the parameters for the search request. The parameters indicate that the account requests results associated with accounts that have been established as an expert in the subject of digital cameras. The parameters indicate that the account also requests results associated with accounts that are similar to the account. Similar accounts may have similar demographic characteristics, similar "likes" or "tags" or links or recommendations within the social platform, similar acquaintances, and so forth. The search engine platform 112 identifiers responsive accounts by filtering the accounts in the social network 500 based on the parameters. The search engine platform 112 generates search results by providing websites, articles, information, and digital camera recommendations that are associated with the responsive accounts. For example, the search engine platform 112 indicates that experts or influencers in the field of digital cameras recommend one or more certain digital camera models. The search engine platform 112 may further indicate that experts or influencers in the field of digital cameras have posted, liked, tagged, read, or interacted with articles or other information about digital cameras. The search engine platform 112 may further indicate that accounts with a similar profile have purchased, wished for, or researched certain digital cameras. The accounts with a similar profile may be connected with the requesting account, may have similar demographic characteristics with the requesting account, may have a similar declared budget as the requesting account, may have similar search histories with the requesting account, and so forth.

In an additional example, a requesting account submits a search request for "Pablo Picasso" to the search engine platform 112. The requesting account includes parameters for the search request. The parameters indicate that the requesting account only wants information and articles that have been "liked," or "tagged," posted by, uploaded by, recommended by, or authenticated by experts in the fields of art history, Pablo Picasso, or modern art. The search engine platform 112 generates a search result that includes articles, website, and information that is associated with the experts.

It should be appreciated that the search engine platform 112 can provide a variety of different search results based on the search request and the search request parameters. The parameters may be specialized to select certain types of experts, certain types of non-expert account, certain types of responses or information, and so forth. For example, the parameters may indicate that the requesting account only wants video responses that are associated with a select grouping of accounts in the social network 500. For example, a requesting account may request entertaining videos or images that are associated with accounts that are connected with the requesting account, and/or have been identified by the requesting account's friends or family, and so forth.

FIG. 7 is a schematic flow chart diagram of an embodiment of a method 700 of providing a personalized search engine to a user. The method 700 may be performed by a computing device such as a search engine platform 112.

The method 700 begins by enabling users to create an account. It will be appreciated that a user account may be both a consumer account and an influencer account depending upon whether the user is searching, or the user profile is being searched by others. In an embodiment, the personalized search engine can only be used by users with a profile on a secure social network such as the social network 500 discussed herein. User accounts may comprise in depth personal profile data. Personal profile data may comprise: user demographic information such as a person's age, gender, geographic location, income bracket, education level, temporal condition or status, and so forth; user opinions, interests, tastes, preferences, political interests, religious/spiritual interests, health, legal status, geographic status and interests, hobbies, products, goods, services, brands, markets, areas of interest or expertise, or any other information of interest to a user.

At 702, the system and method 700 receives a request from the consumer account for a personalized search engine. At 704, the system and method 700 provides a personalized search engine that comprises a search pod that includes the consumer account content, where the user of the consumer account loads the search pod with baseline search parameters based on certain personal profile likeness or other user biases. In another embodiment, the system and method 700 provides a personalized search engine that comprises a search pod that includes the consumer account content, where the user of the consumer account loads the search pod with search parameters based on expertise, or search parameters based on personal profile likeness. At 706, the system and method 700 provides a Similarity threshold and/or Precision threshold command to the user, such that the user may utilize the Similarity threshold and Precision threshold parameters against the retrieved data to discover new and relevant data absent from the user's profile but shared as a commonality amongst the influencer accounts. In another embodiment, the system and method 700 provides a Similarity threshold and/or Precision threshold parameters to the user, such that the user may utilize the Similarity threshold and Precision threshold parameters against the data loaded in the search pod to discover data absent from the user's profile, but shared most commonly amongst the influencer accounts. At 708, the system and method 700 provides the results of the search and displays content or links most common amongst the influencer accounts, but absent from the user's profile.

Figure 8:
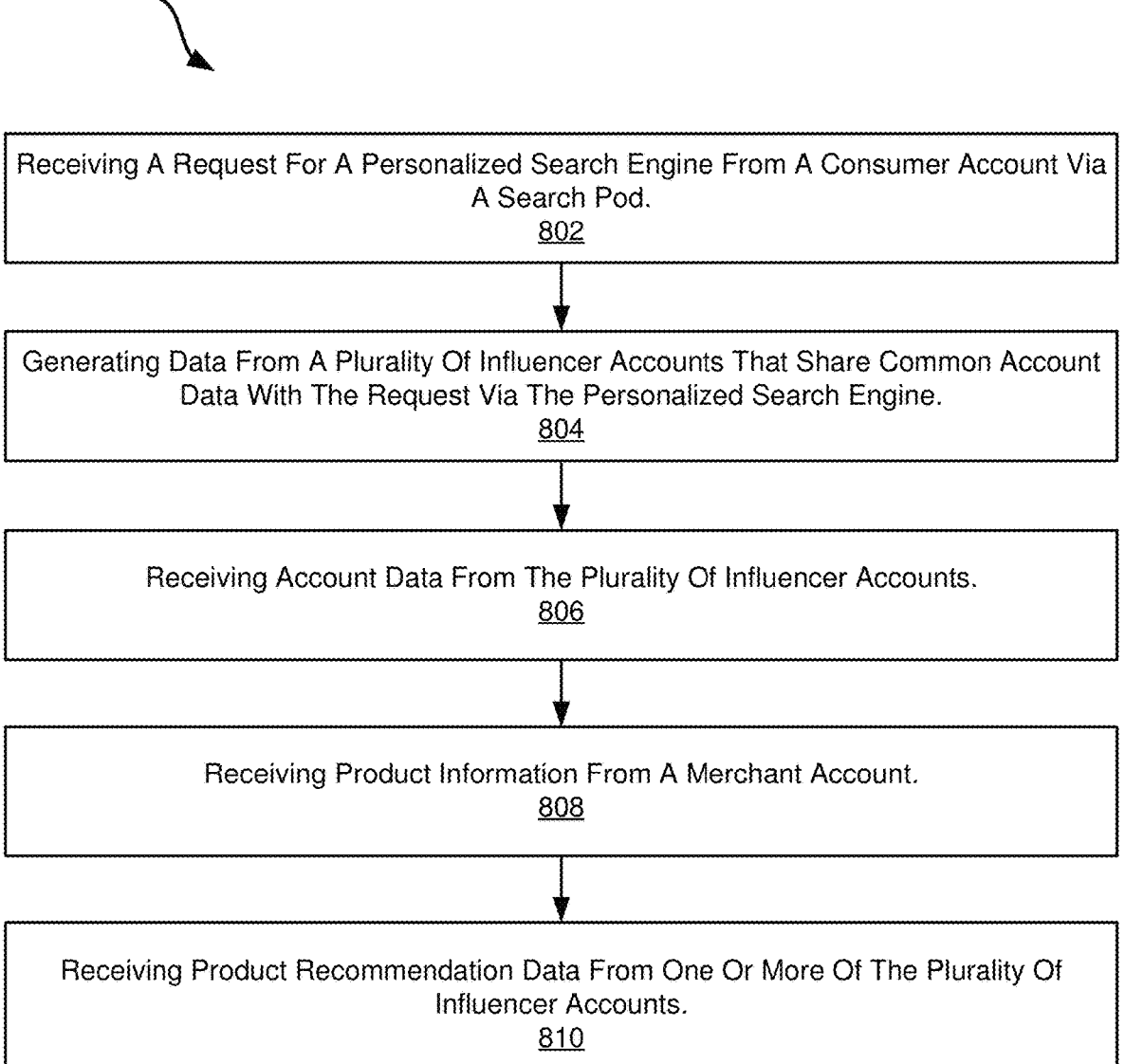
FIG. 8 illustrates a schematic flow chart diagram of a method for generating a personalized search engine, according to an embodiment of the disclosure.

FIG. 8 illustrates a schematic flow chart diagram of an embodiment of a method 800 for generating a personalized search engine. The method 800 may be performed by a computing device such as a search engine platform 112.

The method 800 begins and the computing device receives at 802, via a search pod, a request for a personalized search engine, wherein the request is received from a consumer account. The computing device receives at 804 data from a plurality of influencer accounts that share common account data with the request for the personalized search engine. The computing device receives at 806 account data from the plurality of influencer accounts. The computing device receives at 808 product information from a merchant account. The computing device receives at 810 product recommendation data from one or more of the plurality of influencer accounts.

FIG. 9 is a schematic flow chart diagram of an embodiment of a method 900 of securely authenticating a user. The method 900 may be performed by a computing device such as a search engine platform 112.

The method 900 begins and the computing device receives at 902 a request via NFC token or QR code or another medium limited to short distance communication, thus requiring the parties to be in close proximity in order to authenticate a first person. The method 900 continues and the computing device receives at 904 an indication from a second person showing or verifying an identifier of the first person. The identifier of the person includes, for example, a name, a profile image, a current geographic location, an age or date of birth, a work history, an education history, an address or a place of residence, and so forth. The second person may authenticate that the first person is in fact a real person and has provided accurate identifiers to the social media platform. The computing device receives at 906 first location data from a sensor associated with the first person and receives second location data from a sensor associated with the second person. The computing device determines at 908 that the first person is in close geographic proximity to the second person based on the first location data and the second location data. The computing device provides at 910 a notification to the first person indicating the identity of the first person has been verified.

FIG. 10 is a schematic flow chart diagram of an embodiment of a method 1000 of generating personalized search results based on parameters and information retrieved from accounts in a social network. The method 1000 may be performed by a computing device such as a search engine platform 112.

The method 1000 begins and a computing device receives at 1002 a search request from an account in a social network, wherein the search request is directed to a subject. A computing device determines at 1004 a parameter for filtering accounts in the social network. A computing device identifies at 1006 responsive accounts in the social network comprising information pertaining to the subject. A computing device selects at 1008 one or more of the responsive accounts that satisfy the parameter. A computing device generates at 1010 a response to the search request comprising the information pertaining to the subject from the one or more of the responsive accounts that satisfy the parameter.

Figure 11:
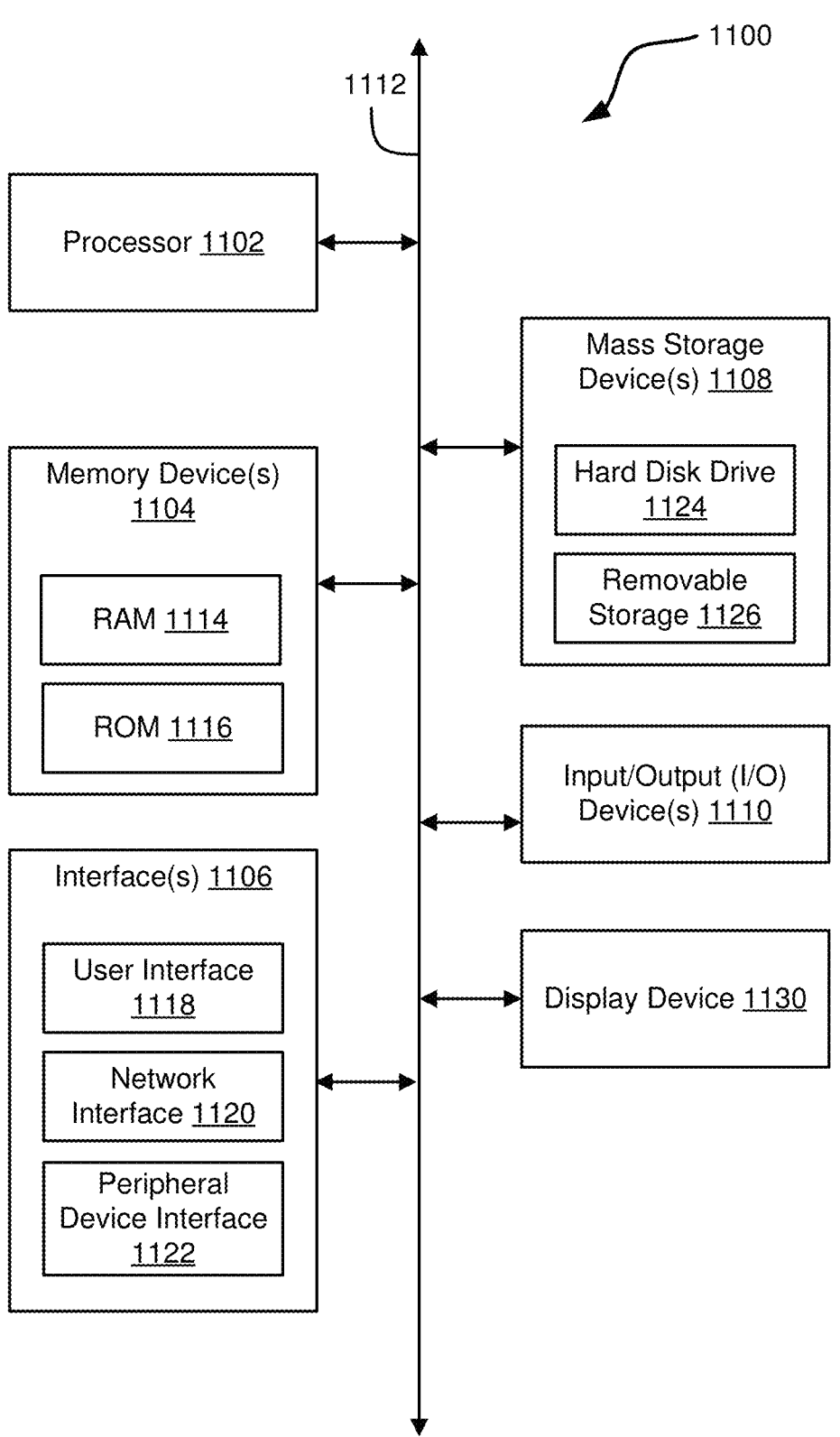
FIG. 11 illustrates an example computing system, according to an embodiment of the disclosure.

Referring now to FIG. 11, a block diagram of an example computing device 1100 is illustrated. Computing device 1100 may be used to perform various procedures, such as those discussed herein. In one embodiment, the computing device 1100 can function as a vehicle controller, a server, and the like. Computing device 1100 can perform various monitoring functions as discussed herein, and can execute one or more application programs, such as the application programs or functionality described herein. Computing device 1100 can be any of a wide variety of computing devices, such as a desktop computer, in-dash computer, vehicle control system, a notebook computer, a server computer, a handheld computer, mobile telephones, chipped clothing, tablet computer and the like.

Computing device 1100 includes one or more processor(s) 1102, one or more memory device(s) 1104, one or more interface(s) 1106, one or more mass storage device(s) 1108, one or more Input/output (I/O) device(s) 1110, and a display device 1130 all of which are coupled to a bus 1112. Processor(s) 1102 include one or more processors or controllers that execute instructions stored in memory device(s) 1104 and/or mass storage device(s) 1108. Processor(s) 1102 may also include various types of computer-readable media, such as cache memory.

Memory device(s) 1104 include various computer-readable media, such as volatile memory (e.g., random access memory (RAM) 1114) and/or nonvolatile memory (e.g., read-only memory (ROM) 1116). Memory device(s) 1104 may also include rewritable ROM, such as Flash memory.

Mass storage device(s) 1108 include various computer readable media, such as magnetic tapes, magnetic disks, optical disks, solid-state memory (e.g., Flash memory), and so forth. As shown in FIG. 11, a particular mass storage device is a hard disk drive 1124. Various drives may also be included in mass storage device(s) 1108 to enable reading from and/or writing to the various computer readable media. Mass storage device(s) 1108 include removable media 1126 and/or non-removable media.

I/O device(s) 1110 include various devices that allow data and/or other information to be input to or retrieved from computing device 1100. Example I/O device(s) 1110 include cursor control devices, keyboards, keypads, camera, microphones, monitors or other display devices, speakers, printers, network interface cards, modems, and the like.

Display device 1130 includes any type of device capable of displaying information to one or more users of computing device 1100. Examples of display device 1130 include a monitor, display terminal, video projection device, and the like.

Interface(s) 1106 include various interfaces that allow computing device 1100 to interact with other systems, devices, or computing environments. Example interface(s) 1106 may include any number of different network interfaces 1120, such as interfaces to local area networks (LANs), wide area networks (WANs), wireless networks, and the Internet. Other interface(s) include user interface 1118 and peripheral device interface 1122. The interface(s) 1106 may also include one or more user interface elements 1118. The interface(s) 1106 may also include one or more peripheral interfaces such as interfaces for printers, pointing devices (mice, track pad, or any suitable user interface now known to those of ordinary skill in the field, or later discovered), keyboards, and the like.

Bus 1112 allows processor(s) 1102, memory device(s) 1104, interface(s) 1106, mass storage device(s) 1108, and I/O device(s) 1110 to communicate with one another, as well as other devices or components coupled to bus 1112. Bus 1112 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1100 and are executed by processor(s) 1102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

EXAMPLES

The following examples pertain to further embodiments.

Example 1 is a method. The method includes receiving a request to authenticate a social profile of a first person. The method includes receiving first location data from a sensor associated with the first person and second location data from a sensor associated with a second person. The method includes determining the first person is in close geographic proximity to the second person based on the first location data and the second location data. The method includes receiving an indication from the second person authenticating the first person and authenticating accuracy of at least one datapoint in the social profile of the first person.

Example 2 is a method as in Example 1, further comprising, in response to receiving the indication from the second person authenticating the first person and authenticating the accuracy of the at least one datapoint in the social profile of the first person, activating the social profile of the first person in a social network.

Example 3 is a method as in any of Examples 1-2, further comprising, in response to receiving the indication from the second person authenticating the first person and authenticating the accuracy of the at least one datapoint in the social profile of the first person, storing an indication that the at least one datapoint has been authenticated.

Example 4 is a method as in any of Examples 1-3, further comprising activating the social profile of the first person in a social network after a threshold number of data points in the social profile of the first person have been authenticated by a person having an activated social profile in the social network.

Example 5 is a method as in any of Examples 1-4, wherein the second person is associated with an activated social profile in a social network.

Example 6 is a method as in any of Examples 1-5, wherein the determining the first person is in close geographic proximity to the second person comprises determining using Near Field Communication (NFC), QR codes.

Example 7 is a method as in any of Examples 1-6, further comprising activating the social profile of the first person in a social network, wherein the social network comprises a plurality of social profiles that have each been authenticated by a person associated with an activated social profile.

Example 8 is a method as in any of Examples 1-7, wherein the sensor associated with the first person and the sensor associated with the second person are each incorporated in a computing device comprising a user interface, and wherein the receiving the indication from the second person authenticating the first person comprises receiving the indication by way of the user interface of the computing device associated with the second person.

Example 9 is a method as in any of Examples 1-8, further comprising: receiving an invitation to join a social network from a social profile associated with the secondperson to be transmitted to the first person; and transmitting the invitation to the first person; wherein the social network comprises a plurality of authenticated social profiles; and wherein the social network is invitation-only such that a person cannot join the social network without first receiving an invitation to join the social network.

Example 10 is a method as in any of Examples 1-9, further comprising, in response to receiving the request to authenticate the social profile of the first person, providing a notification to the first person and the second person indicating that the first person can be authenticated by the second person when the first person and the second person are in close geographic proximity to one another.

Example 11 is a system. The system includes a social network comprising a plurality of authenticated social profiles. The system includes a first social profile associated with a first person, wherein the first social profile has not been authenticated. The system includes a second social profile associated with a second person, wherein the second social profile has been authenticated. The system includes one or more processors configurable to execute instructions stored in non-transitory computer readable storage media. The instructions includes receiving a request to authenticate the first social profile. The instructions include receiving first location data from a sensor associated with the first person and second location data from a sensor associated with a second person. The instructions include determining the first person is in close geographic proximity to the second person based on the first location data and the second location data. The instructions include receiving an indication from the second person authenticating the first person and authenticating accuracy of at least one datapoint in the first social profile.

Example 12 is a system as in Example 11, wherein the instructions further comprise, in response to receiving the indication from the second person authenticating the first person and authenticating the accuracy of the at least one datapoint in the first social profile, activating the first social profile in the social network.

Example 13 is a system as in any of Examples 11-12, wherein the instructions further comprise, in response to receiving the indication from the second person authenticating the first person and authenticating the accuracy of the at least one datapoint in the first social profile, storing an indication that the at least one datapoint has been authenticated.

Example 14 is a system as in any of Examples 11-13, wherein the instructions further comprise activating the first social profile in the social network after a threshold number of data points in the first social profile on have been authenticated by a person having an activated social profile in the social network.

Example 15 is a system as in any of Examples 11-14, wherein the instructions are such that the determining the first person is in close geographic proximity to the second person comprises determining using Near Field Communication (NFC).

Example 16 is non-transitory computer readable storage media storing instructions to be executed by one or more processors. The instructions include receiving a request to authenticate a social profile of a first person. The instructions include receiving first location data from a sensor associated with the first person and second location data from a sensor associated with a second person. The instructions include determining the first person is in close geographic proximity to the second person based on the first location data and the second location data. The instructions include receiving an indication from the second person authenticating the first person and authenticating accuracy of at least one datapoint in the social profile of the first person.

Example 17 is non-transitory computer readable storage media as in Example 16, wherein the instructions further comprise, in response to receiving the indication from the second person authenticating the first person and authenticating the accuracy of the at least one datapoint in the social profile of the first person, activating the social profile of the first person in a social network.

Example 18 is non-transitory computer readable storage media as in any of Examples 16-17, wherein the instructions further comprise, in response to receiving the indication from the second person authenticating the first person and authenticating the accuracy of the at least one datapoint in the social profile of the first person, storing an indication that the at least one datapoint has been authenticated.

Example 19 is non-transitory computer readable storage media as in any of Examples 16-18, wherein the instructions are such that the determining the first person is in close geographic proximity to the second person comprises determining using Near Field Communication (NFC).

Example 20 is non-transitory computer readable storage media as in any of Examples 16-19, wherein the instructions further comprise activating the social profile of the first person in a social network, wherein the social network comprises a plurality of social profiles that have each been authenticated by a person associated with an activated social profile.

Example 21 is a method. The method includes receiving a search request from an account in a social network, the search request directed to a subject. The method includes identifying responsive accounts in the social network comprising information pertaining to the subject. The method includes determining a parameter for filtering the responsive accounts. The method includes selecting one or more of the responsive accounts that satisfy the parameter. The method includes generating a response to the search request comprising the information pertaining to the subject from the one or more of the responsive accounts that satisfy the parameter.

Example 22 is a method as in Example 21, wherein the parameter comprises an expert threshold indicating whether a responsive account is an expert on the subject, the expert threshold comprising one or more of: a threshold period of time with experience in the subject; a threshold number of articles produced by the responsive account pertaining to the subject; a threshold number of recommendations produced by the responsive account pertaining to the subject; a threshold number of indications that the responsive account has expertise in the subject; or an authentication the responsive account has a threshold level of expertise in the subject.

Example 23 is a method as in any of Examples 21-22, wherein the parameter comprises a similarity threshold indicating whether a responsive account is similar to the account, the similarity threshold comprising one or more of: the responsive account having a demographic identifier within a threshold similarity to the account; a threshold number of similar articles associated with the responsive account and the account; a threshold number of similar search history inquires associated with the responsive account and the account; a threshold number of similar product suggestions and/or product purchases associated with the responsive account and the account; or a threshold number of indications that the responsive account and the account are similar.

Example 24 is a method as in any of Examples 21-23, wherein the parameter comprises a quantity threshold indicating whether a responsive account has a threshold percentage of recommendations pertaining to the subject based on all recommendations associated with the responsive account.

Example 25 is a method as in any of Examples 21-24, wherein the parameter comprises one or more of: an expert threshold indicating whether a responsive account is an expert on the subject; or a similarity threshold indicating whether a responsive account is similar to the account; and wherein the method further comprises determining whether the responsive account satisfies a quantity threshold indicating whether the responsive account has a threshold percentage of recommendations pertaining to the subject based on all recommendations associated with the responsive account.

Example 26 is a method as in any of Examples 21-25, wherein the social network comprises a plurality of social accounts each comprising a profile comprising one or more of: demographic information pertaining to a user of a social account; education history pertaining to the user of the social account; work history pertaining to the user of the social account; product recommendations made by the user of the social account; article recommendations made by the user of the social account; products produced or sold by the user of the social account; articles written or produced by the user of the social account; expertise information indicating subjects the user of the social account has expertise in; influencer information indicating subjects the user of the social account is an influencer for; or social connection information indicating other social accounts connected with the social account.

Example 27 is a method as in any of Examples 21-26, wherein the social network is a secure social network such that all accounts within the social network are authenticated by close proximity personhood authentication.

Example 28 is a method as in any of Examples 21-27, wherein the subject is a product and the search request seeks one or more product recommendations for the product, and wherein the response is a listing of product recommendations from the one or more of the responsive accounts that satisfy the parameter.

Example 29 is a method as in any of Examples 21-28, further comprising: storing an indication of a selected search result included in the response that was selected by the account; and identifying a responsive account associated with the selected search result.

Example 30 is a method as in any of Examples 21-29, further comprising boosting a search result within the response to the search request based on the search result being associated with a responsive account involved in a marketing campaign for a product in the subject.

Example 31 is non-transitory computer readable storage media storing instructions to be executed by one or more processors. The instructions comprise receiving a search request from an account in a social network, the search request directed to a subject. The instructions comprise identifying responsive accounts in the social network comprising information pertaining to the subject. The instructions comprise determining a parameter for filtering the responsive accounts. The instructions comprise selecting one or more of the responsive accounts that satisfy the parameter. The instructions comprise generating a response to the search request comprising the information pertaining to the subject from the one or more of the responsive accounts that satisfy the parameter.

Example 32 is non-transitory computer readable storage media as in Example 31, wherein the parameter comprises an expert threshold indicating whether a responsive account is an expert on the subject, the expert threshold comprising one or more of: a threshold period of time with experience in the subject; a threshold number of articles produced by the responsive account pertaining to the subject; a threshold number of recommendations produced by the responsive account pertaining to the subject; a threshold number of indications that the responsive account has expertise in the subject; or an authentication the responsive account has a threshold level of expertise in the subject.

Example 33 is non-transitory computer readable storage media as in any of Examples 31-32, wherein the parameter comprises a similarity threshold indicating whether a responsive account is similar to the account, the similarity threshold comprising one or more of: the responsive account having a demographic identifier within a threshold similarity to the account; a threshold number of similar articles associated with the responsive account and the account; a threshold number of similar search history inquires associated with the responsive account and the account; a threshold number of similar product suggestions and/or product purchases associated with the responsive account and the account; or a threshold number of indications that the responsive account and the account are similar.

Example 34 is non-transitory computer readable storage media as in any of Examples 31-33, wherein the parameter comprises a quantity threshold indicating whether a responsive account has a threshold percentage of recommendations pertaining to the subject based on all recommendations associated with the responsive account.

Example 35 is non-transitory computer readable storage media as in any of Examples 31-34, wherein the parameter comprises one or more of: an expert threshold indicating whether a responsive account is an expert on the subject; or a similarity threshold indicating whether a responsive account is similar to the account; and wherein the instruction further comprise determining whether the responsive account satisfies a quantity threshold indicating whether the responsive account has a threshold percentage of recommendations pertaining to the subject based on all recommendations associated with the responsive account.

Example 36 is one or more processors configurable to execute instructions. The instructions include receiving a search request from an account in a social network, the search request directed to a subject. The instructions include identifying responsive accounts in the social network comprising information pertaining to the subject. The instructions include determining a parameter for filtering the responsive accounts. The instructions include selecting one or more of the responsive accounts that satisfy the parameter. The instructions include generating a response to the search request comprising the information pertaining to the subject from the one or more of the responsive accounts that satisfy the parameter.

Example 37 is one or more processors as in Example 36, wherein the parameter comprises one or more of: an expert threshold indicating whether a responsive account is an expert on the subject; or a similarity threshold indicating whether a responsive account is similar to the account; and wherein the instructions further comprise determining whether the responsive account satisfies a quantity threshold indicating whether the responsive account has a threshold percentage of recommendations pertaining to the subject based on all recommendations associated with the responsive account.

Example 38 is one or more processors as in any of Examples 36-37, wherein the social network is a secure social network such that all accounts within the social network are authenticated by close proximity personhood authentication.

Example 39 is one or more processors as in any of Examples 36-38, wherein the subject is a product and the search request seeks one or more product recommendations for the product, and wherein the response is a listing of product recommendations from the one or more of the responsive accounts that satisfy the parameter.

Example 40 is one or more processors as in any of Examples 36-39, wherein the instructions further comprise: storing an indication of a selected search result included in the response that was selected by the account; and identifying a responsive account associated with the selected search result.

In the above disclosure, reference has been made to the accompanying drawings, which form a part hereof, and in which is shown by way of illustration specific implementations in which the disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium, which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, chipped clothing, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. The terms "modules" and "components" are used in the names of certain components to reflect their implementation independence in software, hardware, circuitry, sensors, or the like. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein purposes of illustration and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method for close proximity personhood authentication, the method comprising:

receiving a request to authenticate a first social profile associated with a first person, wherein the first social profile is associated with an authenticated social network;

receiving first location data associated with the first person;

receiving second location data associated with a second person, wherein the second person has been previously authenticated within the authenticated social network, and wherein the second person is associated with a second social profile;

determining the first person is in close geographic proximity to the second person based on the first location data and the second location data;

receiving first biometric data associated with the first person, wherein the first biometric data comprises a first image captured by a first device;

processing the first image to confirm with facial recognition whether the first image depicts the first person;

in response to determining the first image depicts the first person, confirming that the first device is associated with the first person;

receiving second biometric data associated with the second person, wherein the second biometric data comprises a second image captured by a second device;

processing the second image to confirm with facial recognition whether the second image depicts the second person;

in response to determining the second image depicts the second person, confirming that the second device is associated with the second person;

receiving an indication that the first device associated with the first person digitally exchanged a Near Field Communication (NFC) token directly with the second device associated with the second person;

receiving an indication from the first person device indicating that the first person authenticates an identity of the second person;

authenticating accuracy of at least one datapoint in the second social profile of the second person based upon the authentication provided by the first person;

receiving an indication from the second person device indicating that the second person authenticates an identity of the first person;

authenticating accuracy of at least one datapoint in the first social profile of the first person based upon the authentication provided by the second person;

recording the authentication of the first person on a database configured to store data relating to user accounts for the authenticated social network; and recording the authentication of the second person on the database configured to store the data relating to the user accounts for the authenticated social network;

wherein the first person cannot join the authenticated social network without first exchanging a unique Near Field Communication (NFC) token with an authenticated member of the authenticated social network.

2. The method of claim 1, wherein, in response to receiving the indication from the second person authenticating the identity of the first person, and further in response to authenticating the accuracy of the at least one datapoint in the first social profile of the first person, activating the first social profile of the first person in the authenticated social network.

3. The method of claim 1, wherein, in response to receiving the indication from the second person authenticating the identity of the first person, and further in response to authenticating the accuracy of the at least one datapoint in the first social profile of the first person, storing an indication that the at least one datapoint for the first social profile has been authenticated.

4. The method of claim 1, further comprising activating the first social profile of the first person in the authenticated social network after a threshold number of data points in the first social profile of the first person have been authenticated by a person having an activated social profile in the authenticated social network.

5. The method of claim 1, wherein the second person is associated with an activated social profile in the authenticated social network.

6. The method of claim 1, further comprising activating the first social profile of the first person in the authenticated social network, wherein the authenticated social network comprises a plurality of social profiles that have each been authenticated by a person associated with an activated social profile.

7. The method of claim 1, wherein a sensor associated with the first person and a sensor associated with the second person are each incorporated in a computing device comprising a user interface; and wherein the receiving the indication from the second person authenticating the identity of first person comprises receiving the indication by way of the user interface of the computing device associated with the second person.

8. The method of claim 1, further comprising:

receiving, by the first person, an invitation to join the authenticated social network, wherein the invitation is generated by the second social profile associated with the second person; and transmitting the invitation to the first person;

wherein the authenticated social network comprises a plurality of authenticated social profiles.

9. The method of claim 1, wherein, in response to receiving the request to authenticate the first social profile of the first person, providing a notification to the first person and the second person indicating that the first person can be authenticated by the second person when the first person and the second person are in close geographic proximity to one another.

10. A system for close proximity personhood authentication within a social network comprising a plurality of authenticated social profiles, wherein the system comprises:

a first social profile associated with a first person on an authenticated social network, wherein the first social profile has not been authenticated;

a second social profile associated with a second person on the authenticated social network, wherein the second social profile has been authenticated;

one or more processors configurable to execute instructions stored in non-transitory computer readable storage media, wherein the instructions comprise:

receiving a request to authenticate the first social profile;

receiving first location data associated with the first person;

receiving second location data associated with the second person;

determining the first person is in close geographic proximity to the second person based on the first location data and the second location data;

receiving first biometric data associated with the first person, wherein the first biometric data comprises a first image captured by a first device;

processing the first image to confirm with facial recognition whether the first image depicts the first person;

in response to determining the first image depicts the first person, confirming that the first device is associated with the first person;

receiving second biometric data associated with the second person, wherein the second biometric data comprises a second image captured by a second device;

processing the second image with the neural network to confirm with facial recognition whether the second image depicts the second person;

in response to determining the second image depicts the second person, confirming that the second device is associated with the second person;

receiving an indication that a first device associated with the first person digitally exchanged a Near Field Communication (NFC) token directly with a second device associated with the second person;

receiving an indication that the first device associated with the first person digitally exchanged a Near Field Communication (NFC) token directly with the second device associated with the second person;

receiving an indication from the first person device indicating that the first person authenticates an identity of the second person;

authenticating accuracy of at least one datapoint in the second social profile of the second person based upon the authentication provided by the first person;

receiving an indication from the second person device indicating that the second person authenticates an identity of the first person;

authenticating accuracy of at least one datapoint in the first social profile associated with the first person on the authenticated social network;

recording the authentication of the first person on a database configured to store data relating to user accounts for the authenticated social network; and recording the authentication of the second person on the database configured to store the data relating to the user accounts for the authenticated social network;

wherein the first person cannot join the authenticated social network without first exchanging a unique Near Field Communication (NFC) token with an authenticated member of the authenticated social network.

11. The system of claim 10, wherein the instructions further comprise, in response to receiving the indication from the second person authenticating the identity of the first person, and further in response to authenticating the accuracy of the at least one datapoint in the first social profile of the first person, activating the first social profile of the first person in the authenticated social network.

12. The system of claim 10, wherein the instructions further comprise, in response to receiving the indication from the second person authenticating the identity of the first person, and further in response to authenticating the accuracy of the at least one datapoint in the first social profile of the first person, storing an indication that the at least one datapoint for the first social profile has been authenticated.

13. The system of claim 10, wherein the instructions further comprise activating the first social profile of the first person in the authenticated social network after a threshold number of data points in the first social profile of the first person have been authenticated by a person having an activated social profile in the authenticated social network.

14. Non-transitory computer readable storage media storing instructions to be executed by one or more processors, wherein the instructions comprise:

receiving a request to authenticate a first social profile associated with a first person, wherein the first social profile is associated with an authenticated social network;

receiving first location data associated with the first person;

receiving second location data associated with a second person, wherein the second person has been previously authenticated within the authenticated social network, and wherein the second person is associated with a second social profile;

determining the first person is in close geographic proximity to the second person based on the first location data and the second location data;

receiving first biometric data associated with the first person, wherein the first biometric data comprises a first image captured by a first device;

processing the first image to confirm with facial recognition whether the first image depicts the first person;

in response to determining the first image depicts the first person, confirming that the first device is associated with the first person;

receiving second biometric data associated with the second person, wherein the second biometric data comprises a second image captured by a second device;

processing the second image with the neural network to confirm with facial recognition whether the second image depicts the second person;

in response to determining the second image depicts the second person, confirming that the second device is associated with the second person;

receiving an indication that the first device associated with the first person digitally exchanged a Near Field Communication (NFC) token directly with the second device associated with the second person;

receiving an indication from the first person device indicating that the first person authenticates an identity of the second person;

authenticating accuracy of at least one datapoint in the second social profile of the second person based upon the authentication provided by the first person;

receiving an indication from the second person device indicating that the second person authenticates an identity of the first person;

authenticating accuracy of at least one datapoint in the first social profile of the first person based upon the authentication provided by the second person;

recording the authentication of the first person on a database configured to store data relating to user accounts for the authenticated social network; and recording the authentication of the second person on the database configured to store the data relating to the user accounts for the authenticated social network;

wherein the first person cannot join the authenticated social network without first exchanging a unique Near Field Communication (NFC) token with an authenticated member of the authenticated social network.

15. The non-transitory computer readable storage media of claim 14, wherein the instructions further comprise, in response to receiving the indication from the second person authenticating the identity of the first person, and further in response to authenticating the accuracy of the at least one datapoint in the first social profile of the first person, activating the first social profile of the first person in the authenticated social network.

16. The non-transitory computer readable storage media of claim 14, wherein the instructions further comprise, in response to receiving the indication from the second person authenticating the identity of the first person, and further in response to authenticating the accuracy of the at least one datapoint in the first social profile of the first person, storing an indication that the at least one datapoint for the first social profile has been authenticated.

17. The non-transitory computer readable storage media of claim 14, wherein the instructions further comprise activating the first social profile of the first person in the authenticated social network after a threshold number of data points in the first social profile of the first person have been authenticated by a person having an activated social profile in the authenticated social network.

* * * * *